United States Patent
Kobayashi et al.

(10) Patent No.: US 6,434,343 B1
(45) Date of Patent: Aug. 13, 2002

(54) COMPOSITE MACHINE, SERVER, COMPOSITE MACHINE-SERVER SYSTEM, AND PROGRAM RECORDING MEDIUM

(75) Inventors: Sumitake Kobayashi; Keiji Ishiguro; Ken Murata; Takashi Kawasaki, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/100,320

(22) Filed: Jun. 19, 1998

(30) Foreign Application Priority Data

Jan. 8, 1998 (JP) ............................................. 10-002642

(51) Int. Cl.[7] .......................... G03G 15/00; G06F 15/16
(52) U.S. Cl. ............................. 399/8; 399/82; 709/201; 709/224
(58) Field of Search ................................. 709/203, 206, 709/202, 224, 207, 201; 399/83, 82, 87, 10, 8, 11

(56) References Cited

U.S. PATENT DOCUMENTS

| | | | | |
|---|---|---|---|---|
| 5,408,618 A | * | 4/1995 | Aho et al. | 710/104 |
| 5,483,589 A | * | 1/1996 | Ishida et al. | 379/220 |
| 5,669,040 A | * | 9/1997 | Hisatake | 399/83 |
| 5,859,711 A | * | 1/1999 | Barry et al. | 358/296 |
| 5,978,522 A | * | 11/1999 | Ishii et al. | 382/299 |
| 5,982,994 A | * | 11/1999 | Mori et al. | 395/114 |
| 5,987,225 A | * | 11/1999 | Okano | 358/1.13 |

* cited by examiner

Primary Examiner—Mark H. Rinehart
Assistant Examiner—Paul Kang
(74) Attorney, Agent, or Firm—Staas & Halsey LLP

(57) ABSTRACT

It is intended to provide a composite machine-server system which can handle electronic documents more efficiently and can be realized at a low cost. A composite machine-server system is constructed by connecting a plurality of composite machines and a server to a network. Each of the composite machines has a second-kind process function of executing a second-kind process without cooperating with the server when requested to execute the second-kind process, as well as a first-kind process function of sending, when requested to execute a first-kind process, an electronic document necessary for execution of the first-kind process to the server and requesting the server to execute the first-kind process on the electronic document. The server has a function of executing first-kind processes whose execution is requested by the composite machines.

6 Claims, 26 Drawing Sheets

| FUNCTION | EFFECTIVE/ UNEFFECTIVE |
|---|---|
| FAX MANAGEMENT FUNCTION | EFFECTIVE |
| DOCUMENT MANAGEMENT FUNCTION | EFFECTIVE |
| ⋮ | ⋮ |

FIG. 3

| MAXIMUM CONNECTION NUMBER ||
|---|---|
| COMPOSITE MACHINE IDENTIFICATION INF. -1 | CONNECTION STATUS INF. (CONNECTED/UNCONNECTED) |
| COMPOSITE MACHINE IDENTIFICATION INF. -2 | CONNECTION STATUS INF. (CONNECTED/UNCONNECTED) |
| COMPOSITE MACHINE IDENTIFICATION INF. -3 | CONNECTION STATUS INF. (CONNECTED/UNCONNECTED) |
| ⋮ | ⋮ |
| COMPOSITE MACHINE IDENTIFICATION INF. -m | CONNECTION STATUS INF. (CONNECTED/UNCONNECTED) |

FIG. 4

| TITLE INF. | ADDRESS | FOLDER | ACCESS USER | ACCESS PASSWORD | COOPERATION SCHEME |
|---|---|---|---|---|---|
| | | | | | | 1
| | | | | | | 2
| | | | | | | k

FIG. 5

| | | |
|---|---|---|
| SERVER IP ADDRESS | : | 172.22.21.101 |
| SELF-IP ADDRESS | : | 172.22.21.102 |
| ROUTER ADDRESS | : | 172.22.21.192 |
| OPERATION MODE | : | NORMAL OPERATION/COPY & PRINT |
| CONNECTION STATUS | : | CONNECTED/UNCONNECTED |

FIG. 7

| FUNCTION | FUNCTION FLAG |
|---|---|
| COPY | USABLE (0xFF) /UNUSABLE (0x00) |
| PRINT | USABLE (0xFF) /UNUSABLE (0x00) |
| FAX TRANSMISSION | USABLE (0xFF) /UNUSABLE (0x00) |
| DOCUMENT REGISTRATION (SCANNER) | USABLE (0xFF) /UNUSABLE (0x00) |

FIG. 9

| | | SHEET SIZE | | | | | |
|---|---|---|---|---|---|---|---|
| | | A3 | A4 | A5 | B3 | B4 | LETTER |
| PRINT | SINGLE SIDE | 0 | 1000 | 0 | 100 | 0 | 0 |
| | DOUBLE SIDE | 0 | 50 | 0 | 200 | 0 | 0 |
| FAX | SINGLE SIDE | 10 | 50 | 0 | 50 | 0 | 0 |
| | DOUBLE SIDE | 11 | 100 | 0 | 50 | 0 | 0 |
| COPY | SINGLE SIDE | 0 | 20 | 0 | 200 | 0 | 0 |
| | DOUBLE SIDE | 5 | 50 | 0 | 400 | 0 | 0 |

FIG. 22

| COMPOSITE MACHINE | DATE | COPY | | ... | PRINT | | ... | FAX | | ... |
|---|---|---|---|---|---|---|---|---|---|---|
| | | A3-SINGLE SIDE | A3-DOUBLE SIDE | | A3-SINGLE SIDE | A3-DOUBLE SIDE | | A3-SINGLE SIDE | A3-DOUBLE SIDE | |
| 1 | | | | | | | | | | |
| 1 | | | | | | | | | | |
| 1 | | | | | | | | | | |
| 2 | | | | | | | | | | |
| 2 | | | | | | | | | | |
| n | | | | | | | | | | |
| n | | | | | | | | | | |
| n | | | | | | | | | | |

FIG. 23

COMMAND BODY:

CHARGE                           (KIND OF COMMAND: CHARGING INFORMATION
                                               NOTIFICATION REQUEST)
    TERM =1998/1/1-1998/3/31      (ADDING-UP TERM DESIGNATION INFORMATION)
    REPLY =MAIL                (REPLY COOPERATION SCHEME DESIGNATION INFORMATION)
    [EOF]                              (END OF FILE)

COMMAND RESPONSE BODY:

CHARGE
    TERM =1998/1/1-1998/3/31
    <SEPARATOR INDICATING THAT MIME ATTACHMENT FILE IS ADDED>
    TABULAR FILE OF CHARGING INFORMATION
    [EOF]

FIG. 24

COMPOSITE MACHINE, SERVER, COMPOSITE MACHINE-SERVER SYSTEM, AND PROGRAM RECORDING MEDIUM

BACKGROUND OF THE INVENTION

1. Field of the Invention

The present invention relates to a composite machine-server system that is constructed by connecting composite machines and a server to each other via a network, a composite machine and a server for constructing such a composite machine-server system, and a program recording medium on which a program for causing a computer having a communication function to operate as a server is recorded.

2. Description of the Related Art

In recent years, various kinds of information has come to be exchanged between computers via a network such as an LAN (local area network), a WAN (wide area network), or the Internet. On the other hand, the digitization of copiers has advanced and hence it has become easy to add a fax function or a printer function to a copier. As a result, apparatuses called composite machines that have copier, fax, and printer functions are now on the market.

Composite machines of another type are also known to which an LAN board is added to allow the printer function of the above type of composite machines to be used by a computer that is connected to an LAN (that is, a network printer function is added).

In a system in which a plurality of composite machines each having a network printer function are connected to an LAN, copying and fax transmission of a document can be performed by using each composite machine as well as a document produced by a computer that is connected to the LAN can be printed by an arbitrary composite machine.

However, conventional composite machines are configured without consideration of a mode of use in which data is exchanged between composite machines. Therefore, in an LAN system to which a plurality of conventional composite machines are connected, a process of transferring scan data generated by a certain composite machine to another composite machine cannot be executed easily. That is, although having various functions, a conventional composite machine can be used merely as a printer by a computer that is connected the network.

An object of the present invention is therefore to provide a composite machine-server system which has functions equivalent to or surpassing the functions of systems that are constructed by using conventional composite machines, which can handle electronic documents more efficiently, and which can be realized at a low cost. Another object of the invention is to provide a composite machine and a server which can be used for constructing such a composite machine-server system.

SUMMARY OF THE INVENTION

To attain the above objects, according to the present invention, a composite machine-server system is constructed by connecting a plurality of composite machines and a server to a network. Each of the composite machines has a second-kind process function of executing a second-kind process without cooperating with the server when requested to execute the second-kind process, as well as a first-kind process function of sending, when requested to execute a first-kind process, an electronic document necessary for execution of the first-kind process to the server and requesting the server to execute the first-kind process on the electronic document. The server has a function of executing first-kind processes whose execution is requested by the composite machines.

That is, according to the invention, in constructing a composite machine capable of executing several kinds of processes, the processes are classified into processes (second-kind processes; for instance, copying) that are desired to be executed independently by a composite machine and processes (first-kind processes; for instance, fax transmission and document management) that need not always be executed by a composite machine and are preferred to be executed together by another apparatus (server). For a first-kind process, an electronic document (image data or the like) necessary for its execution is sent to the server. The server are provided with functions for actually executing the first-kind processes whose execution is requested by a plurality of composite machines. And a system (composite machine-server system) is constructed by connecting the server and the composite machines to a network. In this composite machine-server system, each composite machine can execute the first-kind processes even if it does not have hardware necessary for only the first-kind processes (circuits for fax, a storage device for document management, etc.). Therefore, by using the composite machine-server system of the invention, the same document environment as constructed by using conventional composite machines can be realized at a lower cost. Further, since electronic documents relating to first-kind processes that are executed by the composite machines are gathered by the server, electronic documents can be managed more efficiently.

In constructing the composite machine-server system that can attain the above objects, the following composite machine according to the invention can be used.

The invention provides a composite machine that is used in a state that it is connected to a network, comprising (a) scanner means for generating image data of a document; (b) first-kind process executing means for executing first-kind processes each of which uses the image data generated by the scanner means and requires an operation in cooperation with the server; (c) second-kind process executing means for executing second-kind processes each of which uses the image data generated by the scanner means and does not require an operation in cooperation with the server; (d) designating means for designating a first-kind process to be executed by the first-kind process executing means or a second-kind process to be executed by the second-kind process executing means; (e) execution control means for causing the scanner means to generate the image data when a first-kind process or a second-kind process is designated by using the designating means, and for causing the first-kind process executing means or the second-kind process executing means to execute the designated first-kind or second-kind process by using the image data; (f) status judging means for judging whether a status is such that an operation in cooperation with the server is possible; and (g) designation control means for controlling the designating means so that it cannot designate any of the first-kind processes when the status judging means has judged that the status is such that an operation in cooperation with the server is not possible.

As described above, in the composite machine of the invention, the operation state is automatically changed to a state that an execution instruction for an unexecutable process cannot be issued. Therefore, in the composite machine-server system that is constructed by using the composite machines of the invention, a user's execution instruction can cause execution of a process in a reliable manner. In other words, a composite machine-server system can be obtained that is free of an event that after a user instructed to a composite machine to execute a certain process, a message to the effect that the process cannot be executed because no communication is performed with the server is shown to the user.

In implementing the composite machine of the invention, it is desirable to employ, as the status judging means, means that transmits a connection establishment request to the server when the composite machine is started and a first predetermined time after judging that the status was such that an operation in cooperation with the server was not possible, judges that the status is such that an operation in cooperation with the server is possible when receiving from the server an assignment completion notification indicating that a cooperative operation has become possible, and judges that the status is such that an operation in cooperation with the server is not possible when no assignment completion notification is received or when a second predetermined time has elapsed after transmitting a latest request to the server.

This is because an event that requests that exceed the processing ability of the server (information transmission capability of the network) are simultaneously input to the server from composite machines can be prevented if a composite machine-server system is constructed by using the composite machines each employing the above status judging means and a server according to the invention which comprises (1) a predetermined number of request processing means each having a function of processing a request from the composite machines that is received via a network; (2) assigning means for assigning, when receiving a connection establishment request from one of the composite machines via the network, the composite machine that has issued the connection establishment request to one of the predetermined number of request processing means to which no composite machine is assigned if such a request processing means exists, and for sending the composite machine, via the network, an assignment completion notification indicating that an cooperative operation has become possible; and (3) assignment canceling means for canceling assignment of a composite machine to a request processing means that has not received any request from the assigned composite machine for a predetermined time. In other words, this composite machine-server system can be operated in such a manner that a first-kind process for which an execution instruction has been made by a user can be executed reliably at high speed. The server of the invention can be implemented as a dedicated apparatus or by installing, from a program recording medium, to a computer having a communication function (for instance, an LAN board), a program for causing the computer to operates as the server.

The composite machine of the invention may be implemented by employing, as the status judging means, means that recognizes, based on the assignment completion notification, part of the first-kind processes that the server can accommodate; and, as the designation control means, means that controls the designating means so that it cannot designate any of part of the first-kind processes excluding the processes that the status judging means has recognized to be accommodatable by the server, when the status judging means has judged that the status is such that an operation in cooperation with the server is possible. If the above-configured composite machine are used in combination with a server that employs assigning means that transmits an assignment completion notification including information relating to functions that can be executed by the server, a composite machine-server system can be constructed which can be operated in such a manner that the server is provided with only minimum functions at the time of its introduction and thereafter functions are added to the server when they become necessary.

The composite machine of the invention can be implemented by adding operation mode information storing means for storing operation mode information indicating whether the first-kind process executing means is used or not, and employing, as the status judging means, means that judges that the status is such that an operation in cooperation with the server is not possible without communicating with the server if the operation mode storing means stores operation mode information indicating that the first-kind process executing means is not used.

The composite machine of the invention may be implemented by employing, as the execution control means, means that causes the scanner means to generate the image data when a plurality of processes have been designated by using the designating means, and controls the first-kind process executing means or the second-kind process executing means so that it executes the designated processes by using the image data as common data. With this composite machine, a plurality of processes to be executed (for instance, copying and fax transmission, or copying and document registration) can be completed merely by setting a document in the scanner means and designating those processes. This contribute to reducing the manipulation load of an operator. Further, since the scanner means operates only once until completion of a plurality of processes, the total processing time can also be reduced.

A composite machine-server system may be constructed by composite machines each obtained by adding, to the composite machine of the invention, utilization states monitoring means for monitoring utilization states of the first-kind process executing means and the second-kind process executing means; utilization states storing means for storing utilization states information as a monitoring result of the utilization states monitoring means; and utilization states transmitting means for transmitting, to the server, the utilization states information stored in the utilization states storing means, and a server obtained by adding, to the server of the invention, utilization states information storing means for storing, on a composite machine basis, utilization states information that is sent from the composite machines; and utilization states information transmitting means for transmitting, when receiving a utilization states information sending request or according to a preset schedule, the utilization states information stored in the utilization states information storing means to an origination node of the utilization states information sending request. In this case, the server can manage the utilization states of the respective composite machines in a unified manner and the utilization states information stored in the server can be read out from a node connected to the network. Therefore, by using this composite machine-server system, the charging management and the management of expendable supplies can be performed easily.

Where the composite machine is implemented by using the utilization states information storing means, the utilization states information storing means can be nonvolatile storing means, and there can be added destruction detecting means for detecting destruction of the utilization states information stored in the utilization states information storing means; and utilization states information managing means for sending a request for requesting the server to transmit utilization states information relating to the self-composite machine when the destruction detecting means has detected destruction of the utilization states information, and for storing, in the utilization states information storing means, the utilization states information that has been received as a response to the request. A composite machine-server may be constructed by combining the above-configured composite machines with a server in which the utilization states information storing means is nonvolatile storing means, and there are added destruction detecting means for detecting destruction of the utilization states information stored in the utilization states information storing means; and utilization states information managing means for sending requests for requesting the respective composite machines to transmit utilization states information when the destruction detecting means has detected destruction of the utilization states information, and for storing, in the utilization states information storing means, the utilization states information that has been received as responses to the requests. In this case, since the same utilization states information is stored at two locations in the system, a composite machine-server system can be obtained which can be operated with an extremely low possibility that the utilization states information is lost.

The composite machine of the invention may be implemented by adding display means capable of displaying image data, and employing, as the execution control means, means that causes the display means to display the image data generated by the scanner means before causing the first-kind process executing means or the second-kind process executing means to execute the designated first-kind or second-kind process, and causes the first-kind process executing means or the second-kind process executing means to execute the designated first-kind or second-kind process by using the image data only when an instruction to continue the process has been made. With this composite machine, even if generation of image data fails for some reason, the failure can be recognized before actual execution of a process (printing on sheets in the self-apparatus or another apparatus or document registration). Therefore, useless consumption of sheets and time can be prevented.

The designating means, which is a component of the composite machine of the invention, can be a touch panel having a function of displaying an image and a function of outputting position information of touched portion, and the designation control means can be means that controls the designating means (touch panel) so that an image not including a symbol for selecting a process that should be rendered undesignatable is displayed.

BRIEF DESCRIPTION OF THE DRAWINGS

FIG. 3 shows the contents of option information held by the server of the first embodiment;

FIG. 4 shows the contents of composite machines connection information held by the server of the first embodiment;

FIG. 5 shows the contents of other systems cooperation information held by the server of the first embodiment;

FIG. 7 shows the contents of connection information that is held by each composite machine of the first embodiment;

FIG. 9 shows the contents of effective function information that is held by each composite machine of the first embodiment;

FIG. 22 shows the contents of charging information held by each composite machine of the first embodiment;

FIG. 23 shows the contents of charging information held by the server of the first embodiment;

FIG. 24 shows a charging information notification request command to be received by the server of the first embodiment and a response command to be sent from the server;

DETAILED DESCRIPTION OF THE PREFERRED EMBODIMENTS

Embodiment 1

Figure 1:
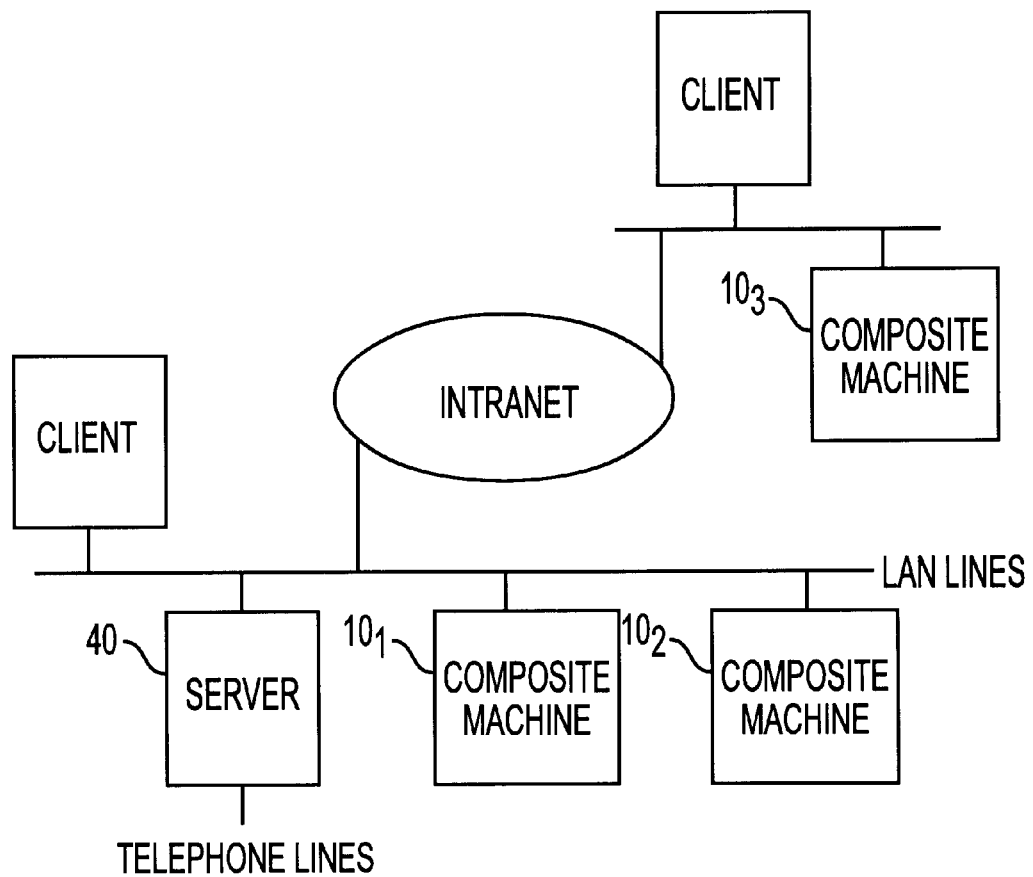
FIG. 1 shows the configuration of a composite machine-server system that is constructed by using composite machines and a server according to a first embodiment of the present invention.

To begin with, the configuration and the operation of a composite machine-server system according to a first embodiment of the present invention will be outlined with reference to FIG. 1.

As shown in FIG. 1, usually the composite machine-server system is constructed by connecting a plurality of composite machines 10 and one server 40 to each other via LANs and an intranet. The server 40 is also connected to telephone lines.

Each composite machine 10 is an apparatus in which functions named a print function, a fax transmission function, and a document registration function are added to what is called an apparatus having a copy function. The print function is a function of causing another composite machine (or an apparatus having equivalent functions) connected to the network to print image data that is obtained by scanning a document (hereinafter referred to as scan data). Another aspect of the print function is a function capable of processing a print request coming from another apparatus connected to the network. The fax transmission function is a function of requesting the server 40 to fax scan data (each composite machine 10 itself of the first embodiment does not have a function of faxing). The document registration function is a function of requesting the server 40 to register scan data (i.e., to store scan data in a folder of an apparatus connected to the network).

Further, each composite machine 10 can simultaneously use a plurality of functions on the same document. That is, for example, each composite machine 10 can fax a certain document while copying it.

The server 40 has a function of processing fax transmission requests and document registration requests from a plurality of composite machines simultaneously (i.e., in a parallel manner), a function of managing the statuses of utilization of the respective composite machines 10.

The configurations and the operations of each composite machine 10 and the server 40 will be described below in a specific manner.

Figure 2:
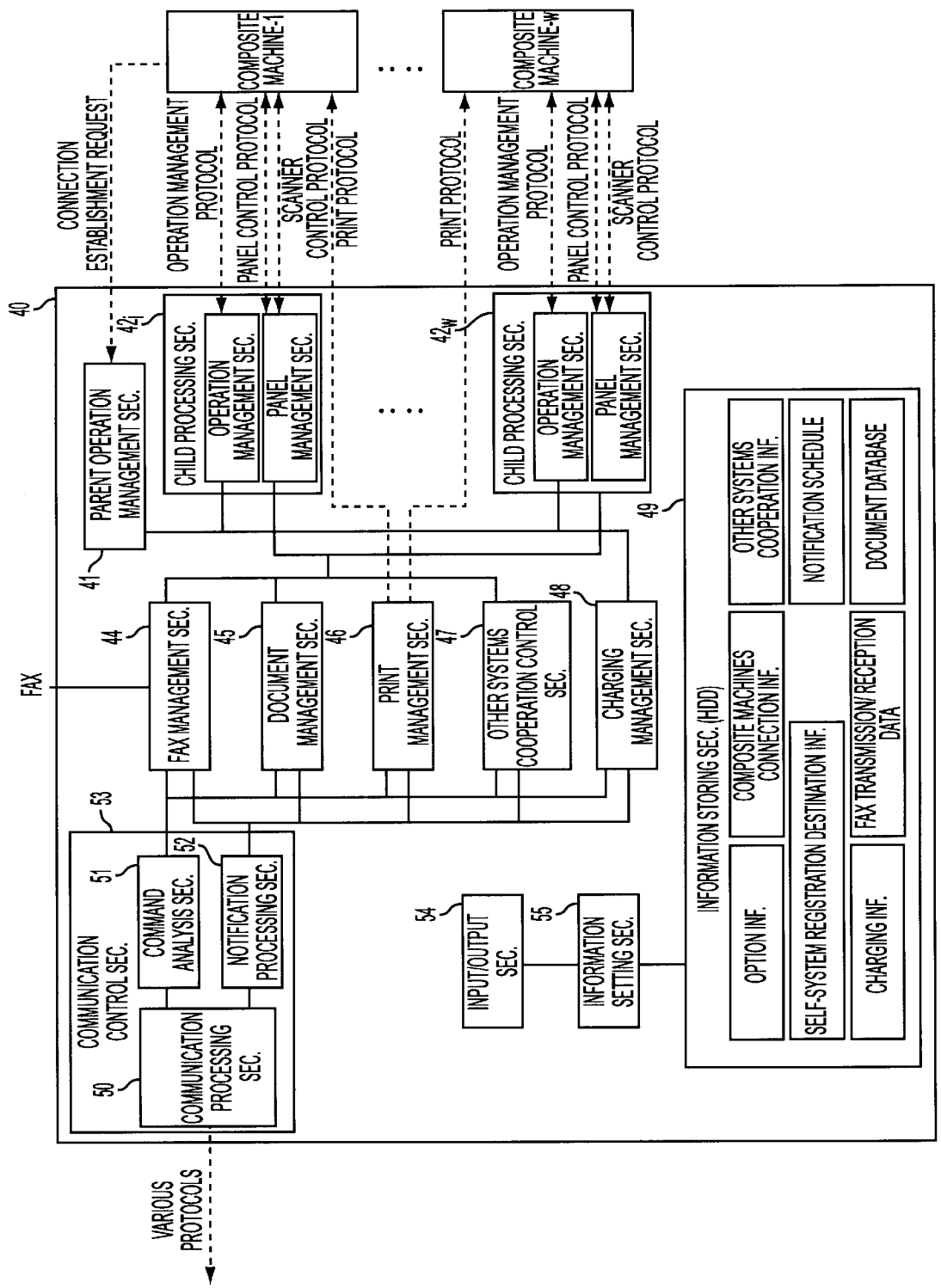
FIG. 2 is a functional block diagram of the server according to the first embodiment.

First, the configuration and the operation of the server 40 will be outlined. FIG. 2 is a functional block of the server 40 according to the first embodiment. As shown in FIG. 2, the server 40 has a parent operation management section 41, a plurality of child processing section 42, a fax management section 44, a document management section 45, print management section 46, an other systems cooperation control section 47, a charging management section 48, an information storing section 49, a communication control section 53, an input/output section 54, and an information setting section 55. The server 40 is implemented by installing a main program that has ben developed for the server and various option programs in a computer having an LAN communication control circuit and a telephone line communication control circuit. The functional block diagram of FIG. 2 corresponds to a case where all the option program are installed.

In principle, the operation of the server 40 is started in a state that option information, composite machines connection information, other systems cooperation information, and self-system registration information are set in the information storing section 49 (corresponding to a HDD (hard disk drive) of the computer).

As schematically shown in FIG. 3, the option information indicates functions that can be executed by the server 40 (i.e., option programs installed in the server 40). When the option programs are installed, the option information is set in the information storing section 49 by their installers.

As shown in FIG. 4, the composite machines connection information consists of identification information of respective connection-permitted composite machines (i.e., IP addresses of the respective composite machines), connection status information indicating whether the server 40 and a composite machine that is identified by the corresponding composite machine identification information are now connected to each other, and the maximum connection number indicating the number of composite machines that can be connected simultaneously. The other systems cooperation information is used in registering a document in a folder of another system. As shown in FIG. 5, the other systems cooperation information consists of information relating to folders of other systems (addresses, folders, access users, access passwords, and cooperation schemes) and title information. The self-system registration destination information is information that is used in registering a document in a folder within the self-system, and has such a form that addresses and cooperation schemes are eliminated from the other systems cooperation information.

Specific procedures of using the composite machines connection information, the other systems cooperation information, the self-system registration destination information will be described later. These kinds of information are set by causing the information setting section 55 to operate by using the input/output section 54 (corresponding to a keyboard, a display, or the like) before the operation of the server 40 is started (or when the network configuration is changed). Since the connection status information that is part of the composite machines connection information is to be rewritten by the server 40, only the maximum connection number and the composite machine identification information are set when the composite machines connection information is set by using the information setting section 55.

As schematically shown in FIG. 2, the parent operation management section 41, the child processing sections 42, the fax management section 44, the print management section 46, and the communication control section 53, which are provided in the server 40, have a function of communicating with another apparatus.

The parent operation management section 41 recognizes, as a connection request, a connection establishment request from a composite machine 10 and judges, by referring to the composite machines connection information (see FIG. 4) in the information storing section 49, whether to accepts the connection request (details will be described later). Upon deciding to accept the connection request, the parent operation management section 41 assigns one child processing section 42 to the composite machine 10 concerned and activates the child processing section 42.

Each child processing section 42 is composed of an operation management section for communicating with the composite machine 10 according to an operation management protocol and a panel management section for communicating with the composite machine 10 according to a panel control protocol and a scanner control protocol. When receiving a request (a fax transmission request, a document registration request, or the like) from a composite machine 10, the child processing section 42 activates the fax management section 44, the document management section 45, or the other systems cooperation control section 47 depending on the content of the request. The child processing section 42 also executes a process of reading data that is requested by a composite machine 10 from the information storing section 49 and returning it to the composite machine 10.

The communication control section 53 is composed of a communication processing section 50, a command analysis section 51, and a notification processing section 52. The communication processing section 50 is a circuit capable of controlling communications according to various network protocols, such as an HTTP (hypertext transport protocol) communication, a mail communication, and an FTP (file transfer protocol) communication. The communication processing section 50 supplies the command analysis section 51 with data (command) corresponding to received communication data. The command analysis section 51 analyzes the command that is supplied from the communication processing section 50, and activates a management section or a control section in accordance with an analysis result. The notification processing section 52 generates, based on an instruction from the management section or the control section, communication data for transmitting given data according to a given protocol. Then, the notification processing section 52 calls the communication processing section 50 and requests it to transmit the generated communication data.

The fax management section 44 receives a fax from fax lines (telephone lines). When given a fax transmission request from a composite machine 10 or some other node via the panel management section 43 or the communication control section 53, the fax management section 44 performs a fax transmission in accordance with the given instruction. Further, the fax management section 44 manages fax transmission/reception data and manages a history of transmission/reception events by using the information storing section 49.

The document management section 45 manages a document database in the information storing section 49. When given an instruction from the command analysis section 51 or the panel management section 43, the document management section 45 registers a new document (electronic document such as image data) or moves or deletes a document in the document database in accordance with the given instruction. Further, the document management section 45 causes a document in the document database to be printed or faxed in cooperation with the print management section 46 or the fax management section 44.

The print management section 46 manages and processes a print request that is input from another system via the command analysis section 51. That is, by using a print protocol, the print management section 46 instructs a designated composite machine 10 to print data that is given from another node.

The other systems cooperation control section 47 processes, by using the communication control section 53, a request for registering a document in another system that is input via the panel management section 43.

The charging management section 48 periodically collects charging information that is stored in the connected composite machines 10 via the child processing sections 42 (operation management sections) and stores the collected charge information in the information storing section 49. When receiving a charging information notification request from another system via the communication control section 53, the charging management section 48 notifies that system of charging information in response to the notification request. Further, where a notification schedule is set in the information storing section 49, the charging management section 48 executes a process of notifying a particular system of charging information according to a schedule defined by the notification schedule.

Next, the configuration and operation of each composite machine 10 will be outlined.

Figure 6:
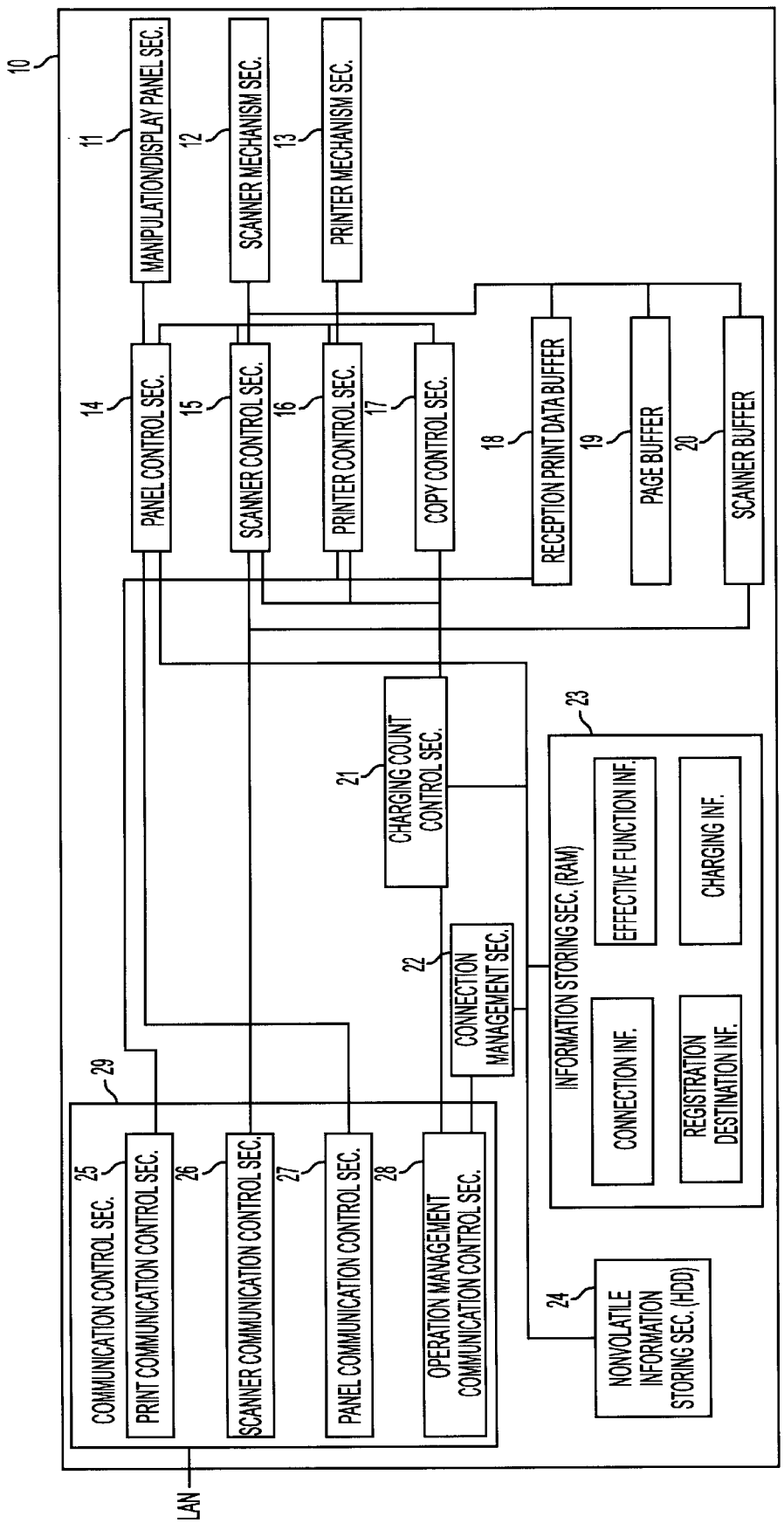
FIG. 6 is a functional block diagram showing the configuration of each composite machine according to the first embodiment.

As shown in FIG. 6, each composite machine 10 has a manipulation/display panel section 11, a scanner mechanism section 12, a printer mechanism section 13, and a communication control section 29. The composite machine 10 also has a panel control section 14, a scanner control section 15, a printer control section 16, a copy control section 17, a charging count control section 21, and a connection management section 22. The composite machine 10 further has a reception print data buffer 18, a page buffer 19, a scanner buffer 20, an information storing section 23, and a nonvolatile information storing section 24.

As shown in FIG. 7, connection information in the information storing section 23 consists of a server IP address, a self-IP address, a router address, an operation mode information, and connection status information. The server IP address, the self-IP address, and the router address are IP addresses of the server 40, the composite machine 10 concerned, and a router that is connected to the LAN to which the composite machine 10 concerned is connected, respectively. The operation mode information indicates whether the server 40 is connected to the network to which the composite machine 10 concerned is connected (or whether to cause the composite machine 10 to operate in cooperation with the server 40). The connection status information indicates whether the composite machine 10 concerned is currently connected to the server 40 (i.e., whether the composite machine 10 is in a state of being capable of operating in cooperation with the server 40).

The operation of the composite machine 10 is started in a state that the original connection information (the connection status information is "unconnected") is set in the nonvolatile information storing section 24.

Figure 8:
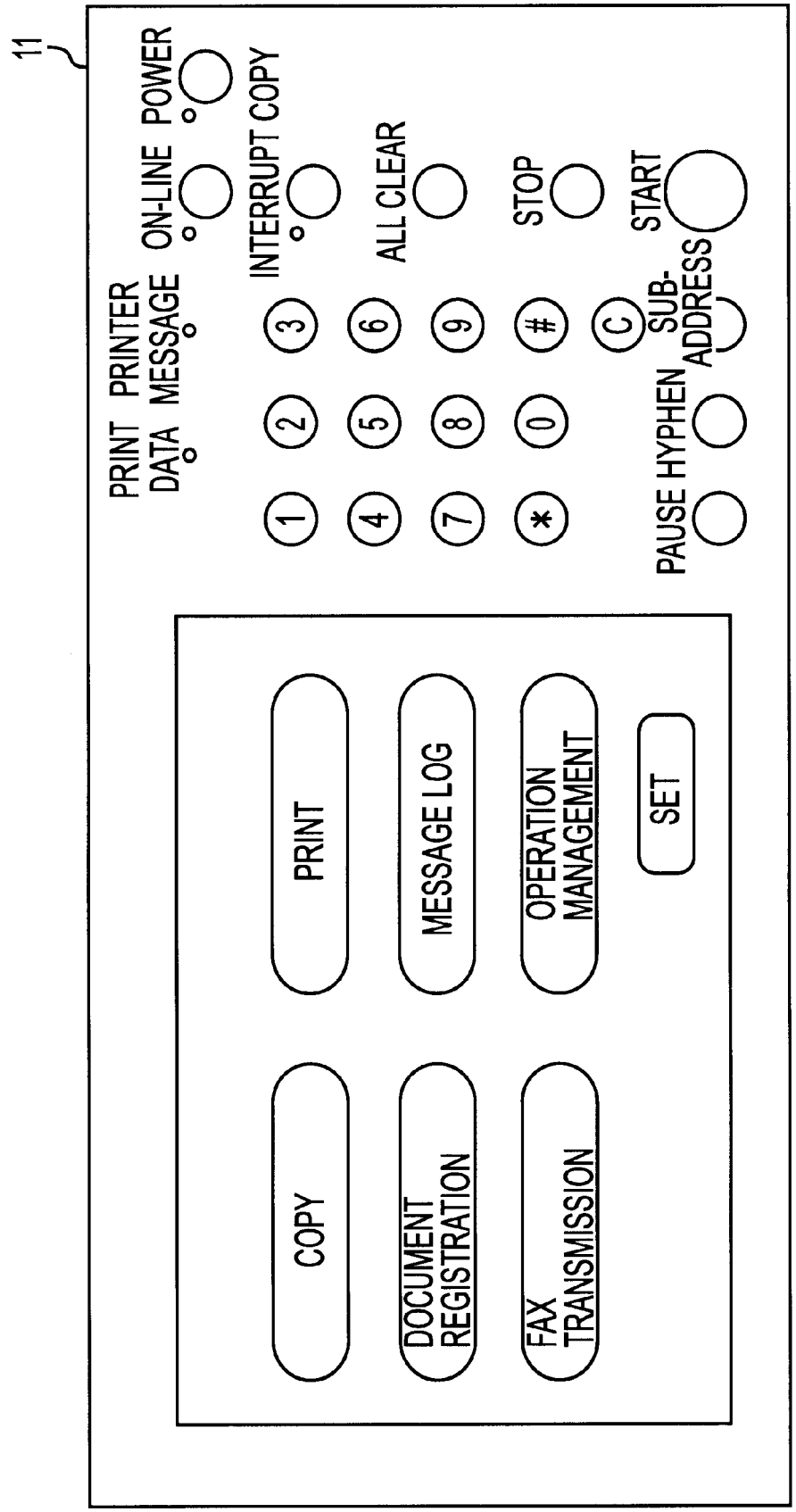
FIG. 8 is an appearance of a manipulation/display panel section that is provided in each composite machine of the first embodiment.

The manipulation/display panel section 11 is an interface between an operator and the composite machine 10. As shown in FIG. 8, the manipulation/display panel 11 is composed of a touch screen panel on which various pictures are displayed, a plurality of button switches, and a plurality of status indication lamps.

The scanner mechanism section 12 is a mechanism for outputting digital data corresponding to a dark and light pattern of a document by using a photodetector while scanning the document that is set in itself. In the first embodiment, the scanner mechanism section 12 is of a type having an automatic document feeder. The printer mechanism section 13 is a mechanism for printing an image corresponding to given raster data on a sheet.

The communication control section 29 is a device for communicating, via the LAN lines, with other apparatuses (the server 40, the composite apparatuses 10, etc.) that are connected to the network. The communication control section 29 is composed of a print communication control section 25, a scanner communication control section 26, a panel communication control section 27, and an operation management communication control section 28. Among those communication control sections, the print communication control section 25 accepts a communication (print request) that conforms to a print protocol and is sent from another system (the server 40, another composite machine 10, or a client) and stores print data that is sent from the request origination system in the reception print data buffer 18. When accepting a print request, the print communication control section 28 informs the printer control section 16 of that fact.

The scanner communication control section 26 accepts a communication (scanner control command) that conforms to a scanner control protocol and informs the scanner control section 15 of that fact. When given a prescribed instruction from the scanner control section 15, the scanner communication control section 26 sends image data that is stored in the scanner buffer 20 to the server 40 via the LAN lines according to the scanner control protocol.

The panel communication control section 27 accepts a communication that conforms to a panel control protocol and informs the panel control section 14 of that fact. When given a command transmission instruction from the panel control section 14, the panel communication control section 27 sends an instructed command to the LAN lines according to the panel control protocol.

The operation management communication control section 28 accepts a communication (command) that conforms to an operation management protocol and informs the charging count control section 21 or the connection management section 22 of the accepted command depending on its content. When given a command transmission request from the charging count control section 21 or the connection management section 22, the operation management communication control section 28 sends an instructed command to the LAN lines according to the operation management protocol.

The panel control section 14 controls the manipulation/display panel section 11 so that a function selection picture (see FIG. 8) for allowing a user to select a function or a data setting picture for allowing him to set data that is necessary for each function to operate. When detecting a manipulation that has been performed on the manipulation/display panel section 11, the panel control section 14 executes a process corresponding to a display content at that time and a content of the detected manipulation (making a change on the manipulation/display panel section 11, or activation of the scanner control section 15, the copy control section 17, or some other section). The panel control section 14 also has a function of generating the original of the above-mentioned connection information in the nonvolatile information storing section 24.

When the panel control section 14 starts a substantial operation, effective function information indicating whether the respective functions of the composite machine 10 are currently effective (see FIG. 9) has been set in the information storing section 23 by the connection management section 22. In displaying the function selection picture, the panel control section 14 refers to the effective function information and causes display of a picture that allows selection of only functions whose function flags are "usable" (details will be described later).

The scanner control section 15 controls the scanner mechanism section 12 in accordance with an instruction given by the panel control section 14, the copy control section 17, or the scanner communication control section 26 so that image data of a document that is set in the scanner mechanism section 12 to be stored in the scanner buffer 20.

The printer control section 16 controls the printer mechanism section 12 in accordance with an instruction given by the copy control section 17 so that image data that is stored in the scanner buffer 20 or the page buffer 19 is printed on a sheet. When given a prescribed instruction from the print communication control section 25, the printer control section 16 causes print data that is stored in the reception print data buffer 18 to be supplied to the printer mechanism section 13 after being converted into raster image data if necessary.

When given a copy operation start instruction from the panel control section 14, the copy control section 17 synchronously controls the scanner control section 15 and the printer control section 16 so that a copy of a document that is set in the scanner mechanism section 12 is printed by the printer mechanism section 13.

When informed by the scanner control section 15, the printer control section 16, or the copy control section 17 of occurrence of an event that requires charging, the charging count control section 21 updates charging information in the information storing section 23. Further, the charging count control section 21 periodically executes a process of generating, in the nonvolatile information storing section 24, a copy of the charging information in the information storing section 23. When receiving a charging information inquiry command from the server 40 via the operation management communication control section 28, the charging count control section 21 informs the server 40 of the charging information via the operation management communication control section 28.

The operations of each composite machine 10 and the server 40 of the first embodiment will be hereinafter described in a more specific manner by referring to flowcharts.

First, an operation of each composite machine 10 at the time of starting and a corresponding operation of the server 40 will be described.

Figure 10:
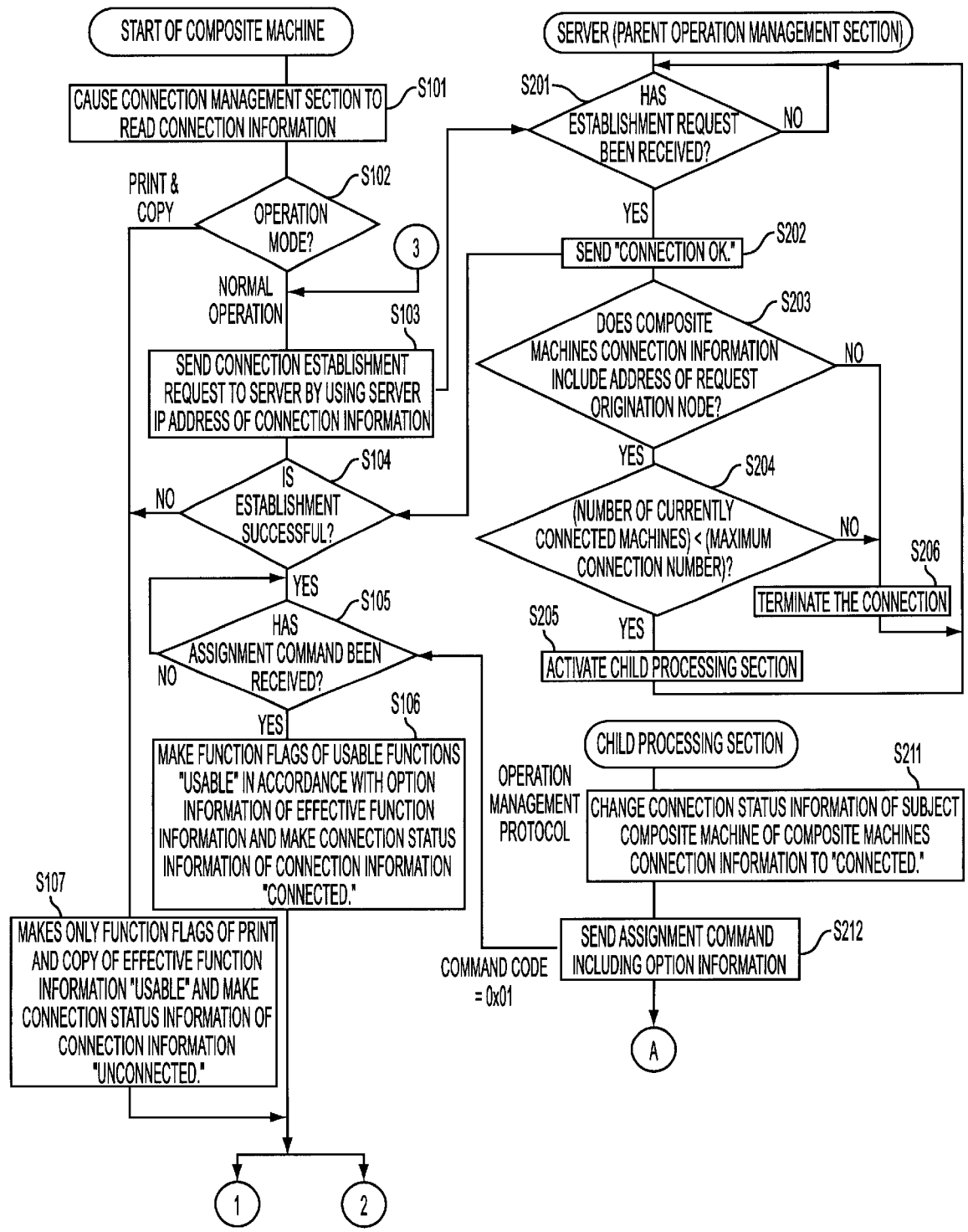
FIG. 10 is a flowchart showing operation procedures of each composite machine and the server of the first embodiment.

As shown in the left part of FIG. 10, when the composite machine 10 has been started (when the power has been turned on), first the connection management section 22 reads out the connection information that is stored in the nonvolatile information storing section 24 and supplies it to the information storing section 23 (step S101). Then, the connection management section 22 judges whether the operation mode of the connection information is "normal operation" or "print & copy" (step S102). If the operation mode is "normal operation" (step S102: "normal operation"), the connection management section 22 controls the operation management communication control section 28 so that a connection establishment request is sent to a node having the server IP address of the connection information, that is, the server 40 (step S103).

On the other hand, after starting of the server 40, the parent operation management section 41 of the server 40 monitors occurrence of a reception of a connection establishment request (step S201). Upon reception of a connection establishment request (step S201: yes), the parent operation management section 41 sends a message "connection OK" to the request origination node (step S202). Then, the parent operation management section 41 judges whether the request origination node that issued the connection establishment request is a composite machine whose address is stored as part of the composite machines connection information (see FIG. 4) (step S203). If the request origination node is a composite machine whose address is stored as part of the composite machines connection information (step S203: yes), the parent operation management section 41 further judges based on the connection status information of the composite machines connection information whether the number of currently connected composite machines is smaller than the maximum connection number (step S204).

If the number of currently connected composite machines is smaller than the maximum connection number (step S204: yes), the parent operation management section 41 activates a child processing section 42 (the operation management section and the panel management section) while giving it the address of the composite machine that issued the connection establishment request (hereinafter referred to as "assigned composite machine") (step S205). Then, the process returns to step S201, where the parent operation management section 41 wait for reception of a connection establishment request from another composite machine.

If the request origination node is a node whose address is not stored as part of the composite machines connection information (step S203: no), or if the number of currently connected composite machines is equal to the maximum connection number (step S204: no), the parent operation management section 41 terminates the connection (step S206) and the process returns to step S201.

Upon the activation, the child processing section 42 (operation management section) of the server 40 changes the connection status information of the assigned composite machine to "connected" (step S211). Then, the child processing section 42 sends an assignment command including the option information (see FIG. 3) to the composite machine 10 (step S212).

After the issuance of the connection establishment request, the connection management section 22 of the composite machine 10 waits for return of "connection OK" from the server 40 (step S104). If "connection OK" is returned (step S104: yes), the connection management section 22 further waits for reception of an assignment command (step S105: no). If an assignment command is received (step S105: yes), the connection management section 22 recognizes currently usable functions based on the option information that is included in the assignment command, makes the function flags of the usable functions of the effective function information (see FIG. 9) "usable" and those of the unusable functions "unusable," and makes the connection status information of the connection information "connected" (step S106).

On the other hand, if the operation mode is "print & copy" (step S102: "print & copy"), or if the connection establishment has failed (step S104: no), the connection management section 22 makes the function flags of the print and copy functions of the effective function information "usable." Further, the connection management section 22 makes the function flags of the fax transmission function and the document registration function "unusable" and makes the connection status information of the connection information "unconnected" (step S107).

After the connection management section 22 has finished the process of FIG. 10, processes (details will be described later) of the panel control section 14 etc. will be started in the composite machine 10. Further, the connection management section 22 starts a process of FIG. 11 independently of the processes of the panel control section 14 etc.

That is, if the connection status of the connection information is "connected" (step S111: yes), the connection management section 22 monitors whether 5 minutes or more have elapsed from the preceding command reception from the server 40 (step S112). If it is detected that 5 minutes or more have elapsed from the preceding command reception (step S112: yes), the connection management section 22 makes the function flags of the fax transmission function and the document registration function "unusable" and makes the connection status information of the connection information "unconnected" (step S113). Then, the connection management section 22 informs the panel control section 14 of the updating of the effective function information (step S114).

On the other hand, if the connection status of the connection information is "unconnected" (step S111: no), the connection management section 22 monitors whether 2 minutes have elapsed after the connection status changed to "unconnected" (step S115). If it is detected that 2 minutes have elapsed (step S115: yes), the process returns to step S103 of FIG. 10, where a connection establishment request is again sent to the server 40.

Figure 11:
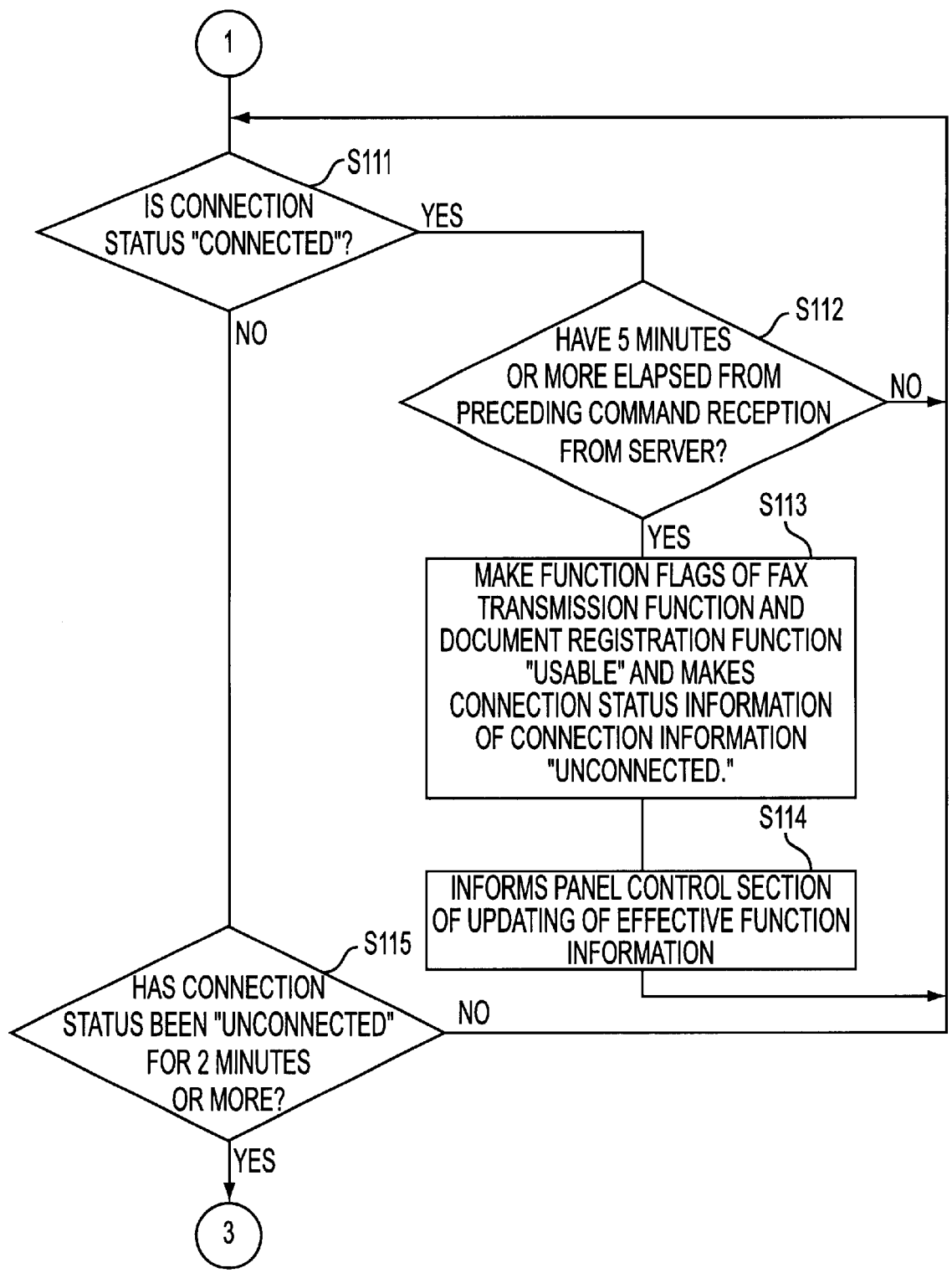
FIG. 11 is a flowchart showing an operation procedure of each composite machine of the first embodiment.

The process of FIG. 11 is executed only when the operation mode is "normal operation" (it is not executed when branching to the "print & copy" side is made at step S102 of FIG. 10), though this is not shown to avoid making the flowcharts unduly complex.

Figure 12:
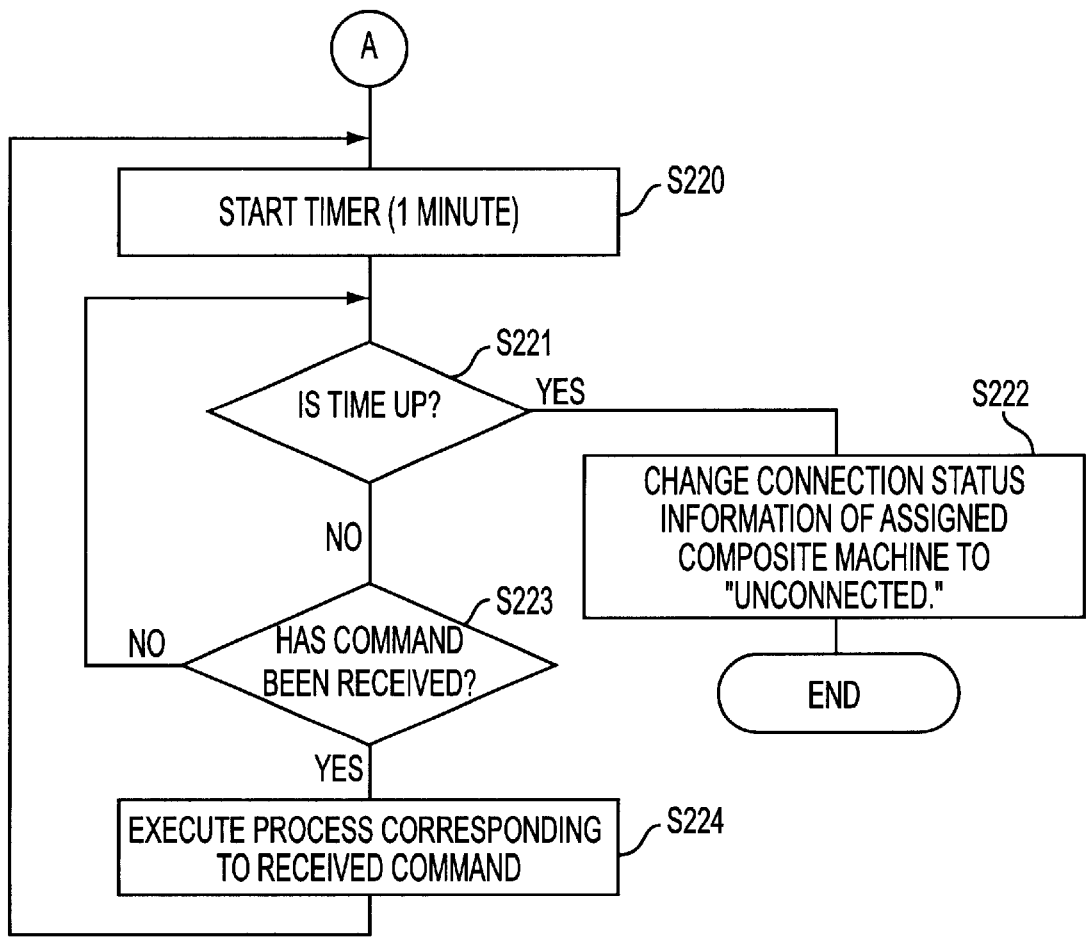
FIG. 12 is a flowchart showing an operation procedure of the server of the first embodiment.

On the other hand, upon the transmission of the assignment command, the child processing section 42 starts a timer (of 1 minute in the first embodiment) as shown in FIG. 12 (step S220). Then, the child processing section 42 monitors whether the time is up with the timer and whether a command has been received from the assigned composite machine 10 (steps S221 and S223). If a command has been received (step S223: yes), the child processing section 42 executes a process and a control corresponding to the received command (step S224). Then, the process returns to step S220, where the timer is started again.

If it is detected without reception of any command that the time is up with the timer (step S221: yes), the child processing section 42 changes the connection status information of the assigned composite machine 10 of the connection information to "unconnected" (step S222) and finishes the process of FIG. 12.

That is, in the composite machine-server system of this embodiment, the limited number of child processing sections 42 (the LAN lines having limited information transmission capability) are efficiently utilized by controlling the connection states according to the above-described procedures.

Next, a description will be made of a process that starts to be executed by the panel control section 14 after the connection management section 22 has finished the process of FIG. 10.

Figure 13:
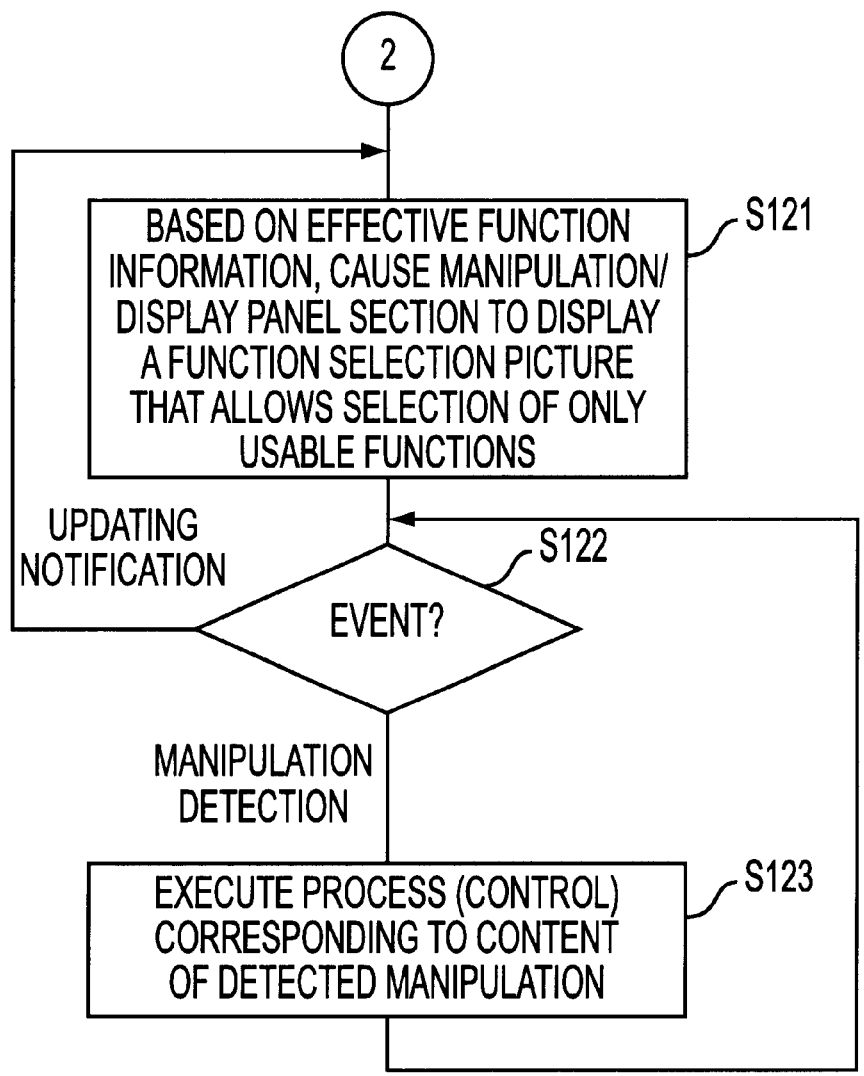
FIG. 13 is a flowchart showing an operation procedure of each composite machine of the first embodiment.
Figure 14A:
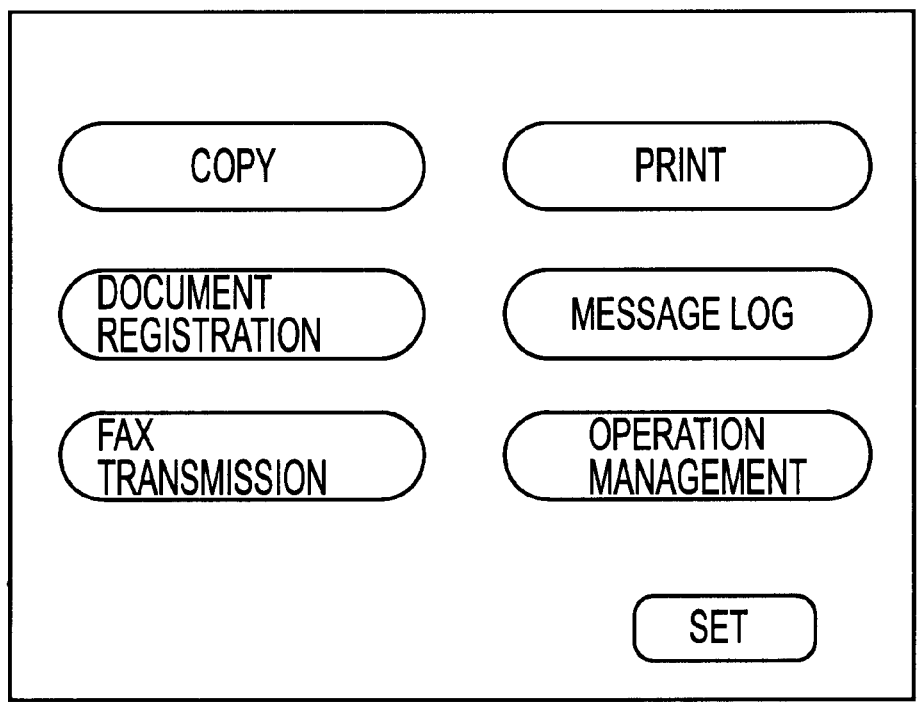
FIGS. 14A and 14B illustrate function selection pictures that are displayed in each composite machine of the first embodiment.
Figure 14B:
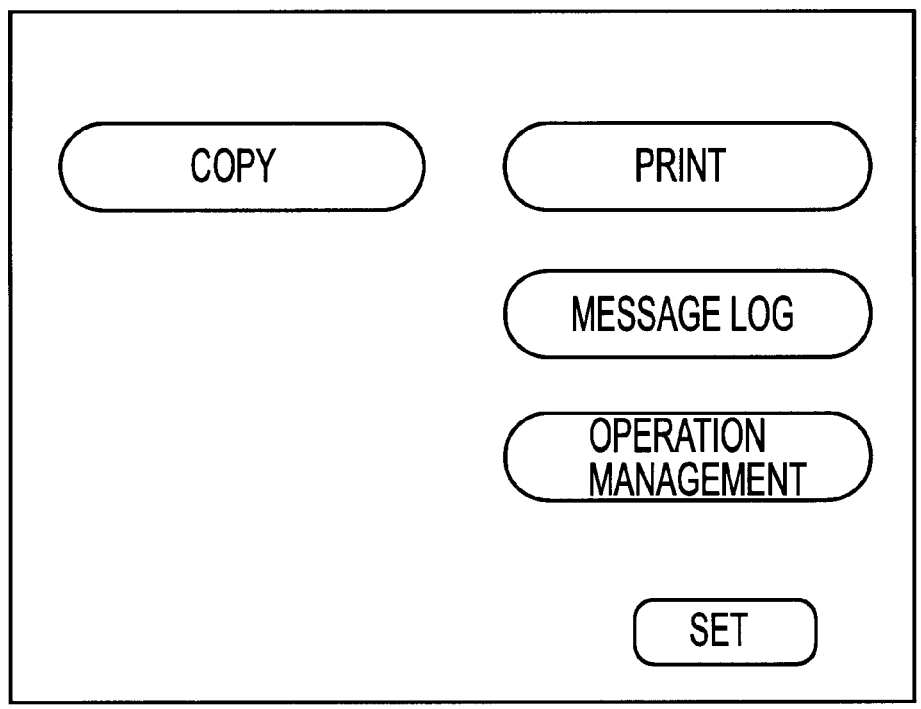

As shown in FIG. 13, first the panel control section 14 causes, based on the effective function information that is stored in the information storing section 23, the manipulation/display panel section 11 to display a function selection picture that allows selection of only the currently usable functions (step S121). Specifically, if all the functions are usable, a function selection picture shown in FIG. 14A is displayed on the manipulation/display panel section 11. If only the print function and the copy function are usable (that is, if the operation mode is "print & copy" or the composite machine was not connected to the server 40), a function selection picture shown in FIG. 14B is displayed on the manipulation/display panel section 11.

Then, the process makes a transition to a state that the panel control section 14 waits for a manipulation on the manipulation/display panel section 11 or issuance from the connection management section 22 of a notification of updating the effective function information (step S122). When informed of updating of the effective function information (step S122: updating notification), the process returns to step S121, where the panel control section 14 makes a change to a picture that reflects the updated effective function information. When detecting a manipulation on the manipulation/display panel section 11 (step S122: manipulation detection), the panel control section 14 executes a process (control) corresponding a content of the manipulation (step S123). The process of FIG. 13 returns to step S122 after completion of that process.

The operation of the panel control section 14 will be described below in a more specific manner.

For example, if an operator wants to use only the document registration function, he selects "document registration" by touching the portion with the indication "document registration" of the function selection picture (see FIG. 14A) and then selects "set."

When detecting the selection of "document registration" during the display of the function selection picture, the panel control section 14 stores that fact at step S123 (see FIG. 13) and performs a control for changing only the display form of "document registration." When detecting the selection of "set," the panel control section 14 recognizes that the function that is used this time is only the document registration function and starts a document registration information setting picture display process, that is, a process for displaying a document registration information setting picture for acquiring, from the operator, information necessary for using the document registration function (i.e., a registration destination).

Figure 15:
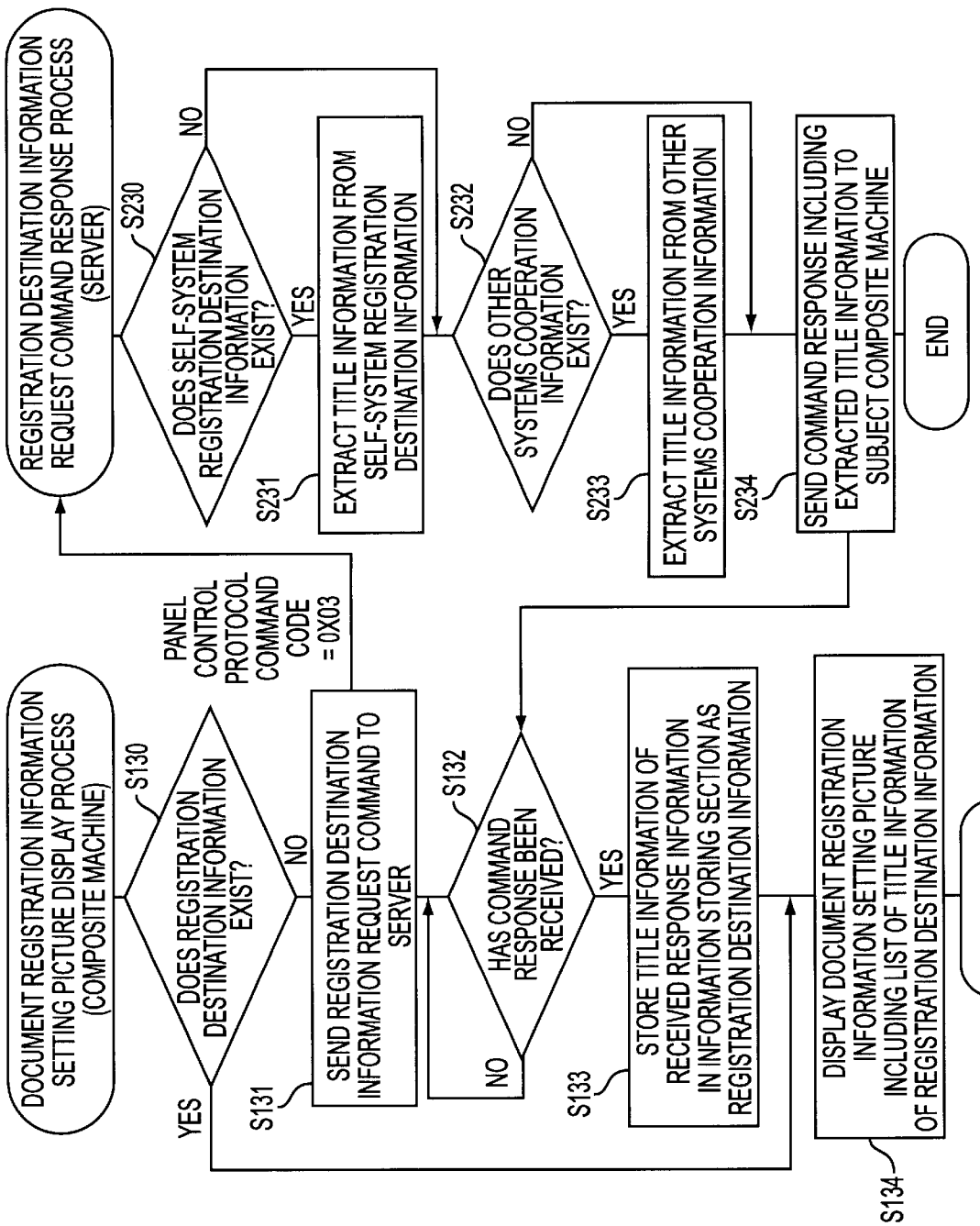
FIG. 15 is a flowchart showing operation procedures of each composite machine and the server of the first embodiment.

As shown in the left part of FIG. 15, in the document registration information setting picture display process, first the panel control section 14 judges whether registration destination information is stored in the information storing section 23 (step S130). If no registration destination information is stored (step S130: no), the panel control section 14 sends a registration destination information request command to the server 40 by using the panel communication control section 27 (step S131).

When receiving the registration destination information request command from the assigned composite machine 10 (hereinafter referred to as "subject composite machine"), the server 40 (child processing section 42) starts a registration destination information request command response process that is shown in the right part of FIG. 15. First, the child processing section 42 judges whether self-system registration destination information exists in the information storing section 49 (step S230). If there exists self-system registration destination information exists (step S230: yes), the child processing section 42 extracts title information from the self-system registration destination information (step S231). Then, the child processing section 42 judges whether other systems cooperation information exists in the information storing section 49 (step S232). If other systems cooperation information exists (step S232: yes), the child processing section 42 extracts title information from the other systems cooperation information (step S234).

Then, the child processing section 42 returns, to the subject composite machine 10, a command response that includes the extracted title information and corresponds to the received registration destination information request command (step S234).

The panel control section 14 that sent the registration destination information request command waits for transmission of a command response corresponding to that command from the server 40 (step S132). When receiving a command response (step S132: yes), the panel control section 14 stores title information included in the received response information in the information storing section 23 as registration destination information (step S133). Then, the panel control section 14 causes the manipulation/display panel section 11 to display a document registration information setting picture that shows the contents of the registration destination information (including a list of title information) (step S134).

If registration destination information is stored in the information storing section 23 (step S130: yes), the process goes to step S134 without the panel control section 14 communicating with the server 40. At step S134, the panel control section 14 causes the manipulation/display panel section 11 to display a document registration information setting picture.

Figure 16:
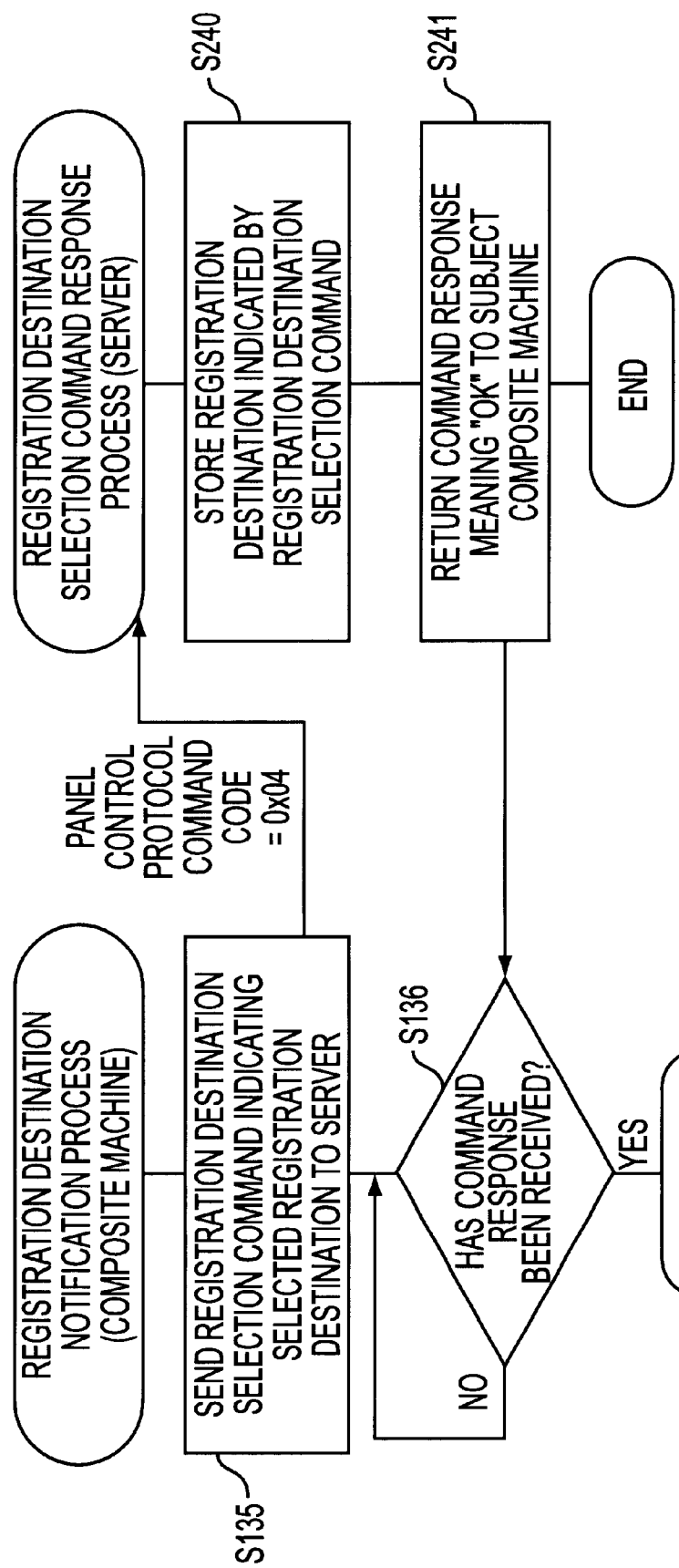
FIG. 16 is a flowchart showing operation procedures of each composite machine and the server of the first embodiment.

Thereafter, at step S122 (see FIG. 13), the panel control section 14 waits for a manipulation on the manipulation/display panel section 11. When detecting selection of a registration destination (title information), the panel control section 14 sends a registration destination selection command including the selected title information to the server 40 according to the panel control protocol as shown in the left part of FIG. 16 (step S135). As shown in the right part of FIG. 16, the child processing section 42 that has received the registration destination selection command stores the registration destination that is indicated by the registration destination selection command (step S240) and returns a command response meaning "OK" to the subject composite machine 10 (step S241). The panel control section 14 that has received the command response finishes the process of FIG. 16 and waits for a next manipulation (i.e., depression of the start button that is an instruction for starting document registration).

Figure 17:
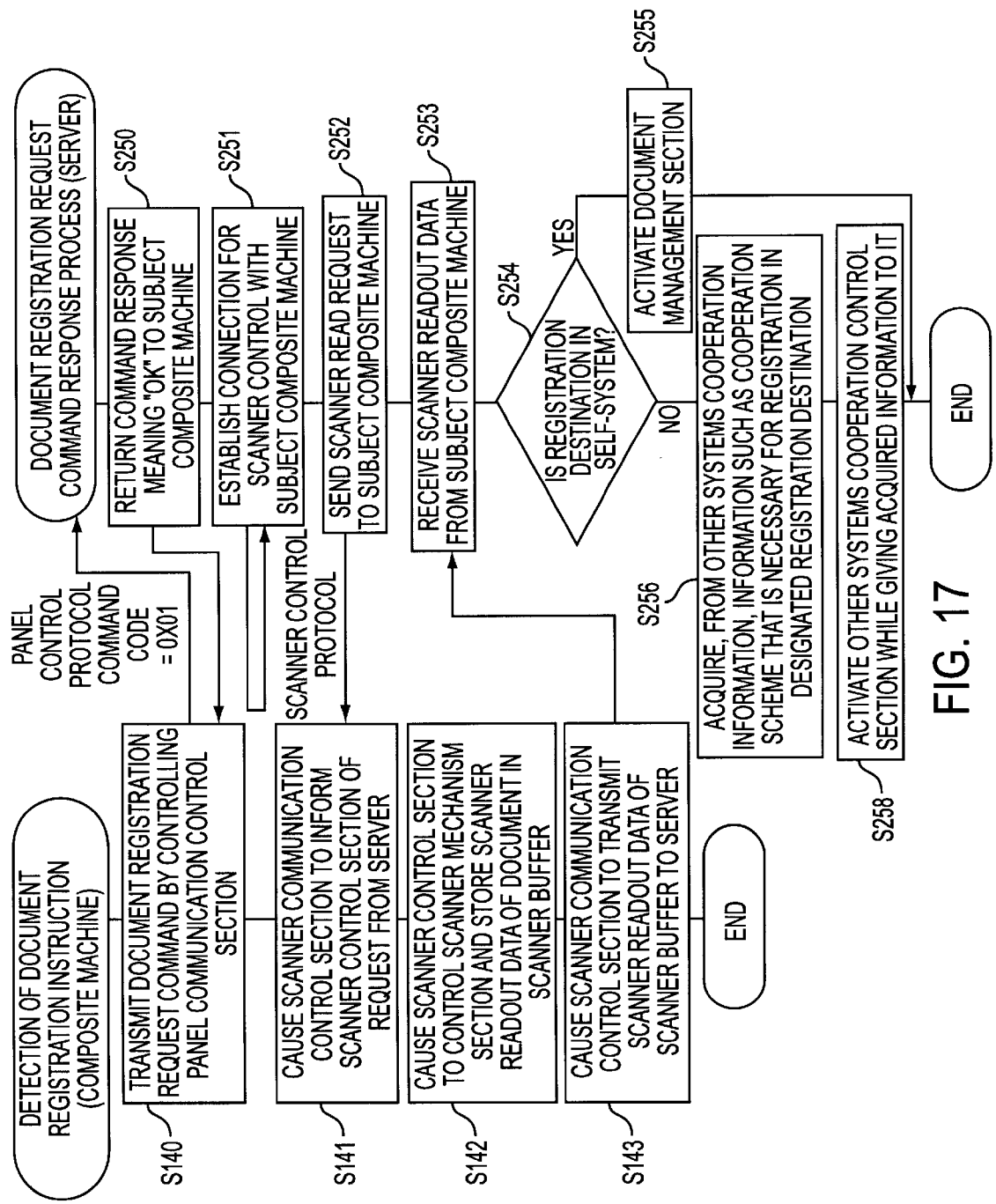
FIG. 17 is a flowchart showing operation procedures of each composite machine and the server of the first embodiment.

When detecting the start of document registration, the panel control section 14 transmits a document registration request command to the server 40 by controlling the panel communication control section 27 as shown in the left part of FIG. 17 (step S140).

The server 40 (child processing section 42) that has received the document registration request command returns a command response meaning "OK" to the subject composite machine 10 as shown in the right part of FIG. 17 (step S250) and establishes a connection for scanner control with the subject composite machine 10 (step S251). Then, the child processing section 42 sends a scanner read request to the subject composite machine 10 according to the scanner control protocol (step S252).

The scanner control section 15 is informed, by the scanner communication control section 26 of the subject composite machine 10, of the scanner read request that has been sent from the child processing section 42 (step S141). Upon reception of this notification, the scanner control section 15 controls the scanner mechanism section 12 and stores scanner data of a document in the scanner buffer 20 (step S254). Then, the scanner communication control section 26 transmits the scanner data of the scanner buffer 25 to the server 40 (step S255).

The child processing section 42 of the server 40 receives the scanner data from the subject composite machine 10 (step S253). If the designated registration destination is a folder in the self-system (step S254: yes), the child processing section 42 acquires, from the self-system registration destination information, information necessary for registration in the designated registration destination and activates the document management section 45 (step S255). Then, the activated document management section 45 registers the scanner data that has been sent from the subject composite machine 10 in the designated registration destination.

On the other hand, if the registration destination is a folder in another system (step S254: no), the child processing section 42 acquires, from the other systems cooperation information, information necessary for registration in the designated registration destination (step S257) and activates the other systems cooperation control section 47 by using the acquired information (step S258). The activated other systems cooperation control section 47 executes a process of registering the scanner data that has been sent from the subject composite machine 10 in the registration destination in the system that is not the self-system.

Figure 18:
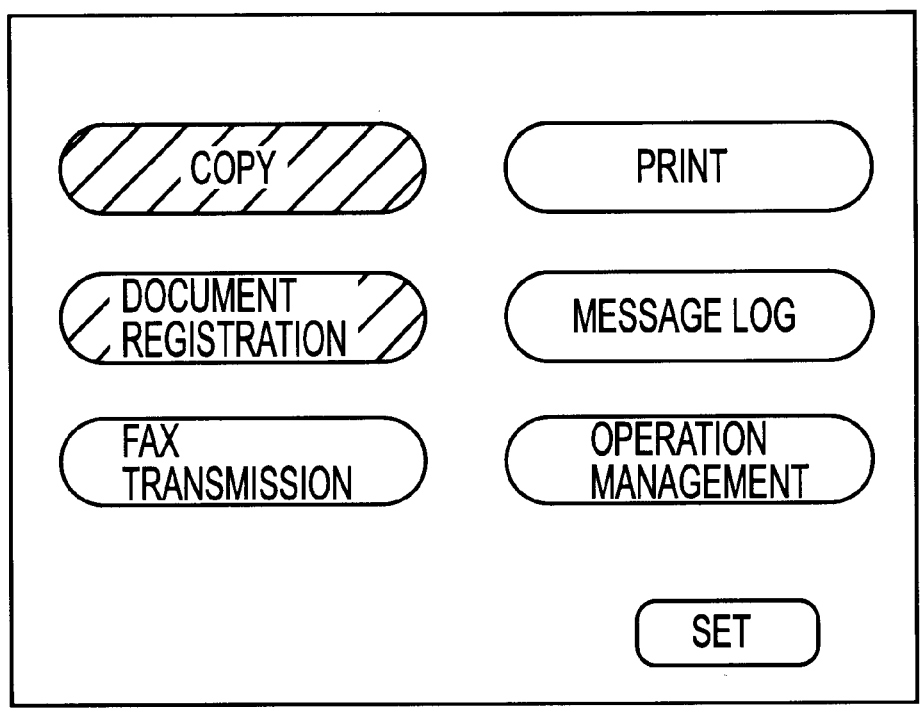
FIG. 18 shows a function selection picture to be displayed in each composite machine of the first embodiment.

For example, when an operator wants to use the copy function and the document registration function, he touches the portions with the indications "copy function" and "document registration" of the function selection picture. When detecting such a manipulation, the panel control section 14 changes the contents of the function selection picture so that they indicate that the portions "copy function" and "document registration" are selected as schematically shown in FIG. 18.

Figure 19:
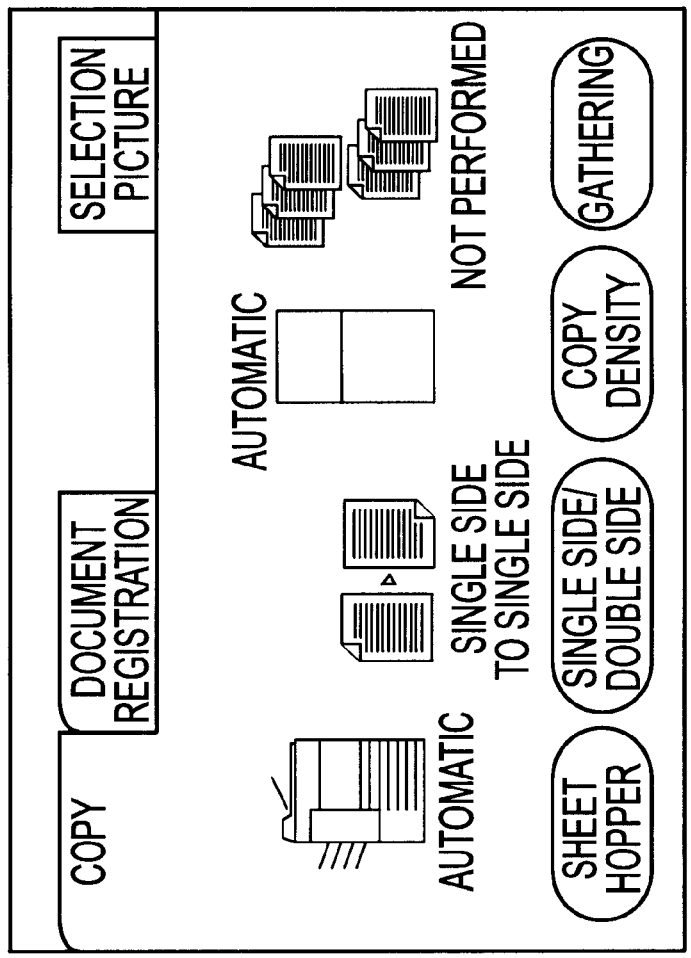
FIG. 19 shows an information setting picture to be displayed in each composite machine of the first embodiment.

Thereafter, when detecting that the portion "set" has been selected, the panel control section 14 recognizes that the functions to be used this time are the copy function and the document registration function and causes the manipulation/display panel section 11 to display a picture as shown in FIG. 19 for setting of information relating to copying and document registration. Then, the panel control section 14 successively store data corresponding to contents of respective manipulations. When detecting an instruction to start operation, the panel control section 14 transmits a document registration request command to the server 40 by controlling the panel communication control section 27, in the same manner as in the case of the document registration process of FIG. 17. Further, the panel control section 14 instructs the printer control section 16 to print scanner data that is stored in the scanner buffer 20 by the scanner control section 15.

As described above, when an instruction to execute processes of the copy function and the document registration function is made, the related sections of the composite machine 10 are controlled so that the processes of both functions are executed by using the same scanner data. Similarly, for other combinations of functions, related sections are controlled so that processes of those functions are executed by using the same scanner data. For example, when an instruction to execute processes of a plurality of functions including the document registration function and the fax transmission function, the composite machine 10 (panel control section 14) sends the server 40 a command that instructs the server 40 to perform fax transmission and document registration on the same scanner data and the server 40 performs fax transmission and document registration by using scanner data that is sent from the composite machine 10.

Figure 20:
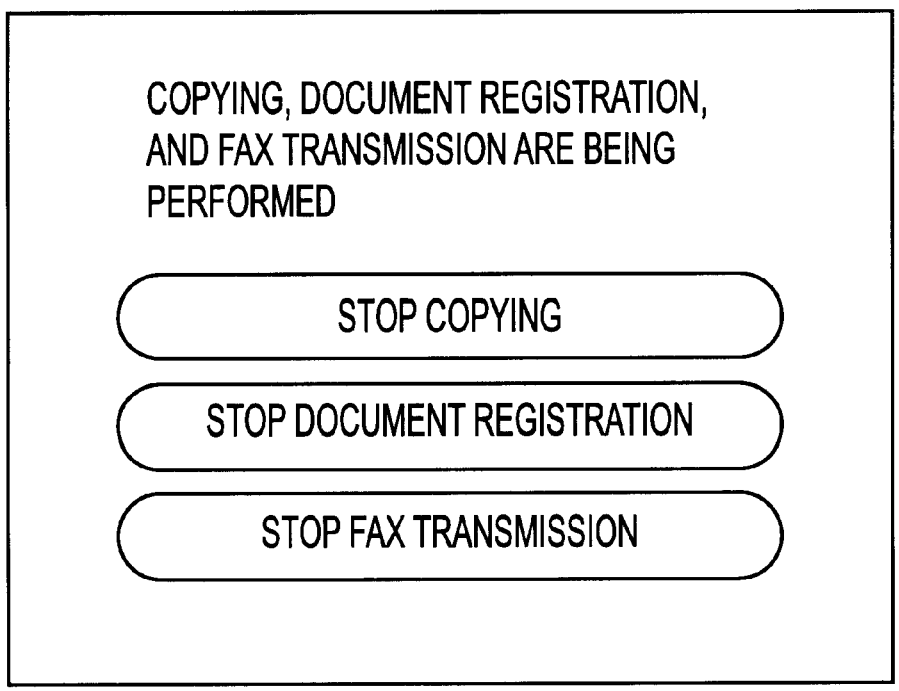
FIG. 20 shows a status display picture to be displayed in each composite machine of the first embodiment.

While simultaneously executing processes of a plurality of functions, the panel control section 14 causes the manipulation/display panel section 11 to display a status display picture as shown in FIG. 20. When one of the "stop" character strings on the manipulation/display panel section 11 is selected, the execution of the process of the function corresponding to the selected character string and the contents of the status display picture are changed accordingly.

Next, operations relating to the charging information of each composite machine 10 and the server 40 will be described.

Figure 21:
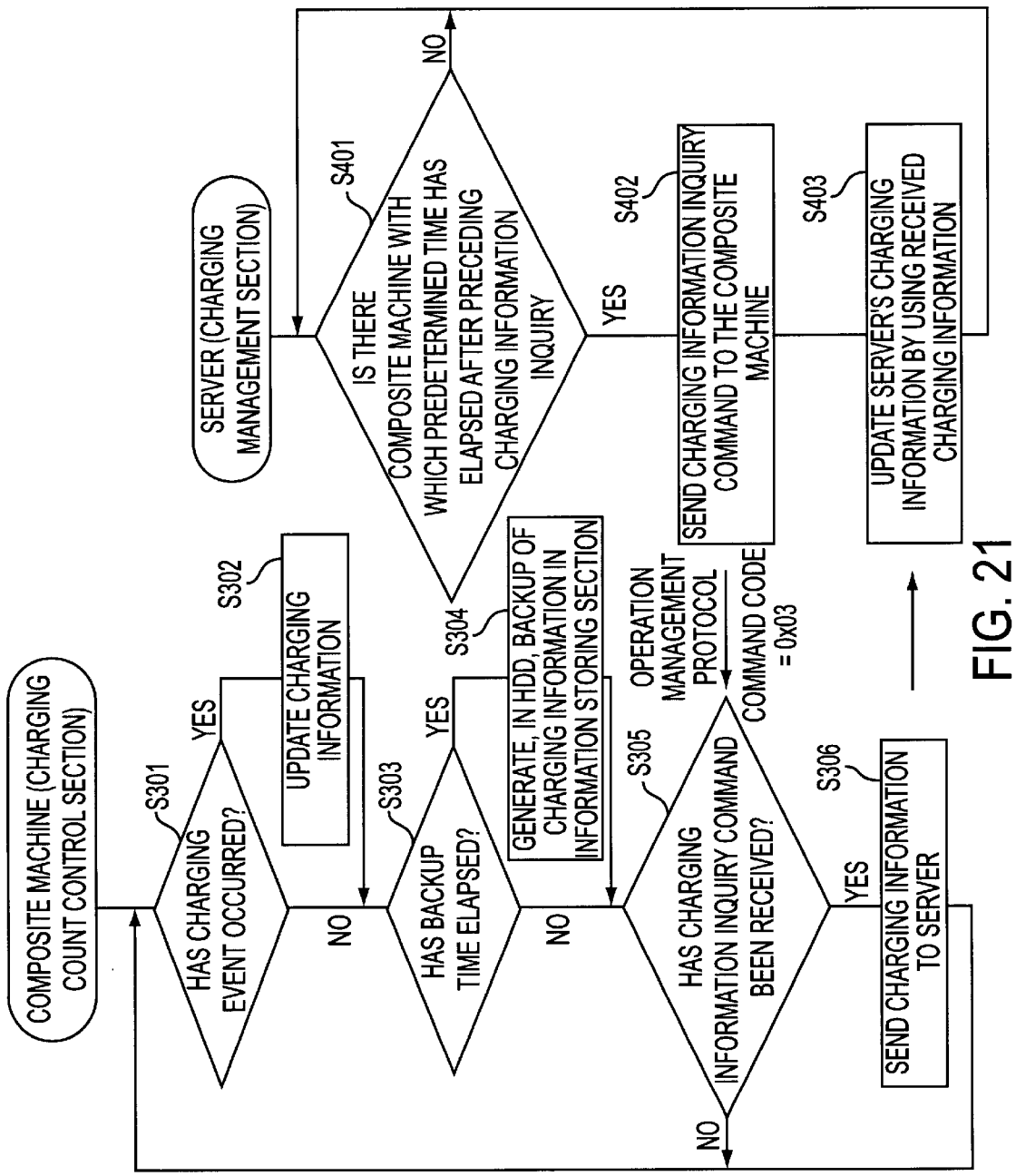
FIG. 21 is a flowchart showing operation procedures of each composite machine and the server of the first embodiment.

As shown in the left part of FIG. 21, the charging count control section 21 of each composite machine 10 always monitors occurrence of a charging event, a lapse of a backup time, and reception of a charging information inquiry command from the server 40.

When detecting occurrence of a charging event (step S301: yes), the charging count control section 21 updates the charging information stored in the information storing section 23 (step S302).

The charging information in the information storing section 23 is information for storing one-day utilization states. The number of times of use of each process is stored as shown in FIG. 22. At step S301, the charging count control section 21 recognizes occurrence of charging events based on notifications from the control sections 15–17. For example, while copying is performed, the copy control section 17 notifies the charging count section of a sheet size and single side/double side information every time a copy is made on a sheet. The charging count section 21 recognizes occurrence of a charging event based on that notification and updates the contents of the charging information in the information storing section 23 in accordance with the notified information.

When detecting a lapse of the backup time (step S303: yes), the charging count control section 21 generates, in the nonvolatile information storing section 24, a backup of the charging information in the information storing section 23 (step S304). At step S304, a backup that is the charging information in the information storing section 23 plus date information is generated in the information storing section 23. More specifically, this is done in the following manner. A charging information file that is a file (database) for storing charging information for each date is prepared in the nonvolatile information storing section 24. At step S304, the charging count control section 21 replaces the charging information for the date concerned in the charging information file with the charging information in the information storing section 23. The charging information in the information storing section 23 is cleared after generation of its backup (after updating of the contents of the charging information file), when the date changes or the power is turned off.

When receiving a charging information inquiry command from the server 40 (step S305: yes), the charging count control section 21 sends the charging information in the information storing section 23 to the server 40 (step S306).

The charging information inquiry command is a command that the charging management section 48 of the server 40 sends by using the communication control section 53.

As shown in the right part of FIG. 21, the charging management section 48 monitors, for each connected composite machine 10, whether a predetermined time has elapsed from the preceding charging information inquiry (step S401).

If there is a composite machine 10 with which the predetermined time has elapsed from the preceding charging information inquiry (step S401: yes), the charging management section 48 sends a charging information inquiry command to that composite machine via the child processing section 42 (operation management section) (step S402). Then, the charging management section 48 updates the charging information in the server 40 by using charging information that is sent from the composite machine 10 (step S403).

As shown in FIG. 23, the charging information stored in server 40 is information for adding up charging information on a composite machine/date basis. In executing step S403, if there already exists charging information for the composite machine 10 for which the charging information has been acquired and of the date of the charging information acquisition, the charging management section 48 adds the charging information from the composite machine 10 to the existing charging information. If there does not exist such charging information, the charging management section 48 generates a new entry for the acquired charging information.

The charging count control section 21 of each composite machine 10 and the charging management section 48 of the server 40 are also given the following functions.

The charging count control section 21 regularly checks whether the charging information file in the nonvolatile information storing section 24 is in a state that it can be read out correctly. When detecting that the charging information file is destroyed, the charging count control section 21 requests the server 40 to send the charging information for the self-composite machine 10 and reconstructs a charging information file based on the transmitted charging information.

Like the charging count control section 21, the charging management section 48 regularly checks whether the charging information in the information storing section 49 is in a state that it can be read out correctly. When detecting that the charging information is destroyed, the charging management section 48 requests each composite machine 10 to send the information of the charging information file and reconstructs charging information based on the transmitted information.

That is, the composite machine-server system of the first embodiment is configured in such a manner that the same charging information is stored in each composite machine 10 and the server 40. In other words, the composite machine-server system of the first embodiment is a system having an extremely low possibility that the system loses the charging information.

The charging information in each composite machine 10 and the server 40 is cleared upon completion of its use.

Specifically, in using (collecting) the charging information, the manager of the charging information sends the server 40 a charging information notification request command as shown in FIG. 24 by using a management terminal capable of communicating with the server 40.

Figure 25:
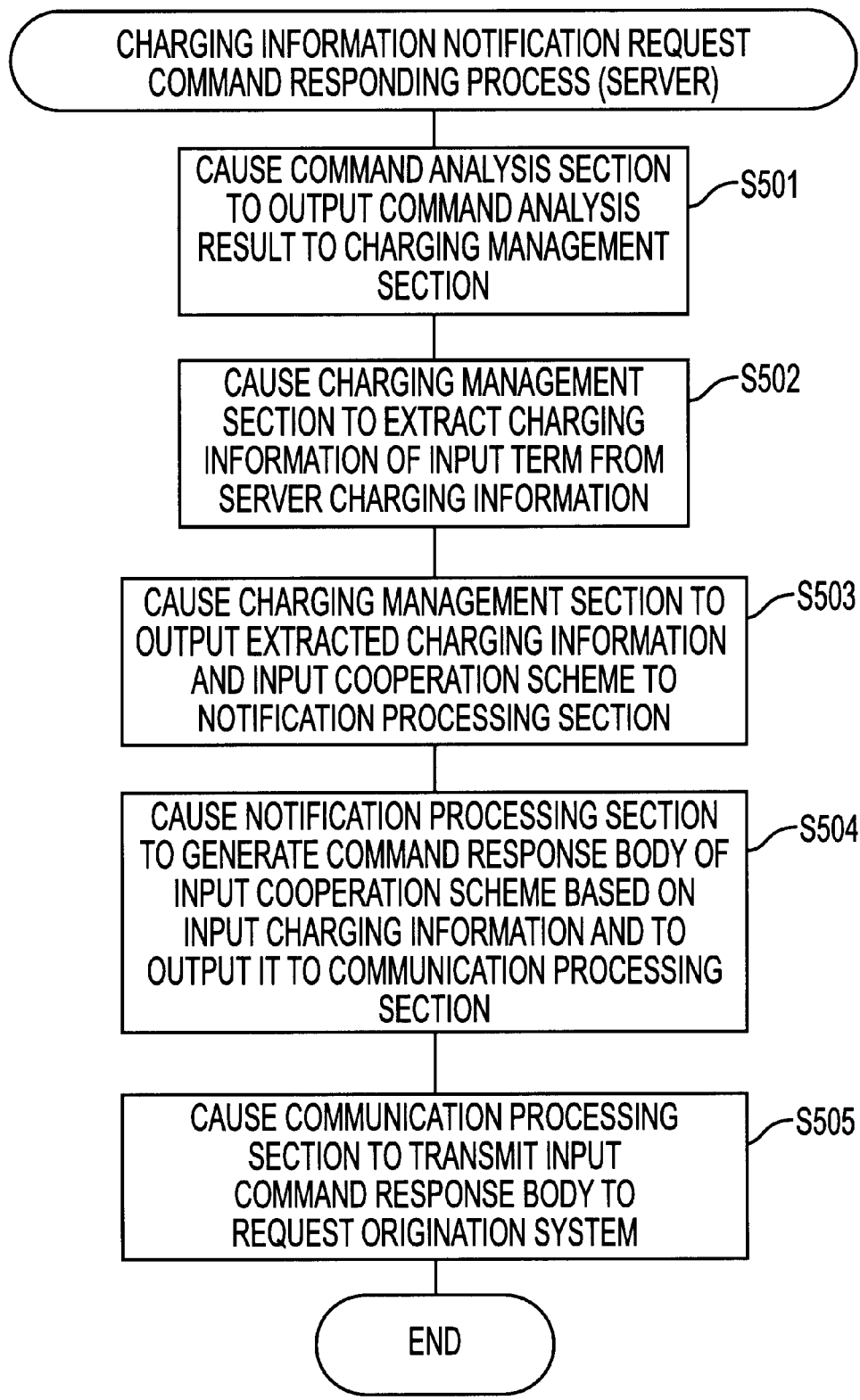
FIG. 25 is a flowchart showing a procedure of the server of the first embodiment for responding to the charging information notification request command.

When the charging information notification request command has reached the server 40, the command analysis section 51 of the server 40 outputs an analysis result (contents of the charging information notification request command) to the charging management section 48 as shown in FIG. 25 (step S501). The charging management section 48 extracts charging information of an input period (1998/1/1–1998/3/31) from the charging information in the information storing section 49 (step S502). Then, the charging management section 48 outputs the extracted charging information and an input cooperation scheme (mail) to the notification processing section 52 (step S503).

The notification processing section 52 generates a command response body as shown in FIG. 24 based on the input charging information and cooperation scheme and outputs it to the communication processing section 50 (step S504). The communication processing section 50 sends the received command response body to the request origination system (step S505).

After receiving the necessary charging information, the manager sends, by using the management terminal, the server 40 a command for instructing it to clear the charging information that has already been used (i.e., a command that specifies a of clearing). When receiving this command via the communication control section 53, the charging management section 48 erases designated information of the charging information in the information storing section 49 as well as sends each of related composite machines 10 a command for instructing it to erase the same information in the charging information file. The charging count control section 21 of each composite machine 10 that has received the command erases the designated information from the charging information file 10.

Further, as already outlined above, if a notification schedule is set in the information storing section 49, the charging management section 48 executes a process that conforms to its contents. Specifically, a notification schedule consists of the address of a notification destination, a cooperation scheme with it, and schedule information indicating dates/time points when a notification should be made. Where a notification schedule is set in the information storing section 49, the charging management section 48 sends charging information that has been collected after the preceding sending of charging information to a system having the address that is set in the notification schedule according to the set cooperation scheme when it becomes the dates/time points that are specified by the schedule information. In the server 40 of embodiment, the schedule information is a combination of information indicating that a notification should be made at a certain time point every day, information indicating that a notification should be made at a certain time point of a certain day of every week, and information indicating that a notification should be made at a certain time point of a certain day every month. For example, the notification schedule enables the server 40 to be notified of charging information at time X of the first day and time Y of the 15th day of every month, and at time Z of Monday of every week.

Actually, the commands relating to charging information and charging information itself are exchanged between the management terminal and the server 40 by utilizing a password-based encryption technique to avoid illegal use and falsification of information.

Specifically, a password is registered (stored) in advance in the server 40 by the manager and a command is transmitted to the server 40 after it is encrypted by using the password as a key. The server 40 executes a process corresponding to the transmitted command only when the command is decoded correctly by using a key corresponding to the password. Similar encryption is performed when charging information is transmitted from the server 40.

Embodiment 2

A composite machine-server system according to a second embodiment will be hereinafter described, which is constructed by composite machines according to the first embodiment and composite machines and a server according to the second embodiment. The composite machine and the server according to the second embodiment are apparatuses obtained by adding functions to those according to the first embodiment. Therefore, the composite machine and the server according to the second embodiment will be described for parts that are different than in the composite machine and the server according to the first embodiment.

The composite machine according to the second embodiment has a large-capacity HDD that corresponds to the nonvolatile information storing section 24, and can register documents in the HDD. That is, the composite machine according to the second embodiment can use a document registration function (document registration in only folders of the self-composite machine) even in a state that it is not connected to the server.

Further, having circuits capable of transmitting and receiving a fax signal, the composite machine according to the second embodiment can use a fax transmission function even in a state that it is not connected to the server as well as respond to a fax transmission request from the server.

A procedure according to which the composite machine operates when instructed to execute a process of the fax transmission function in a state that it is not connected to the server is the same as in ordinary fax machines. However, when the composite machine according to the second embodiment is instructed to execute a process of the fax transmission function in a state that it is connected to the server, the composite machine and the server operate in the following manner.

When instructed to execute a process of the fax transmission function in a state that it is connected to the server, the composite machine (hereinafter referred to as "request origination composite machine") informs the server of an already input telephone number to use its fax transmission function.

On the other hand, the server is given fax numbers and transmission/reception baud rates of the respective composite machines. When informed of a telephone number of a fax transmission destination by the request origination composite machine, the server determines an apparatus (a composite machine or the server itself) capable of performing fax transmission at the lowest telephone rate based on the fax numbers and the transmission/reception baud rates of the respective composite machines that are held internally.

If the determined apparatus is the request origination composite machine, the server instructs the request origination composite machine to fax scanner data. On the other hand, if the determined apparatus is not the request origination composite machine, the server instructs the request origination composite machine to send scanner data to the server. Then, if the server itself is the apparatus capable of fax transmission at the lowest telephone rate, the server fax the received scanner data by using its own fax transmission function. If a composite machine that is not the request origination composite machine is an apparatus capable of fax transmission at the lowest telephone rate, the server requests that composite machine to fax the received scanner data.

The composite machine according to the second embodiment also has a function called a thumbnail display function, which will be described below in detail.

The thumbnail display function is a function for preventing printing or registration of dirty image data due to a failure in the scanner mechanism section's reading a document (i.e., converting it into scanner data). The thumbnail display function is on/off-settable on a data setting picture.

Figure 26:
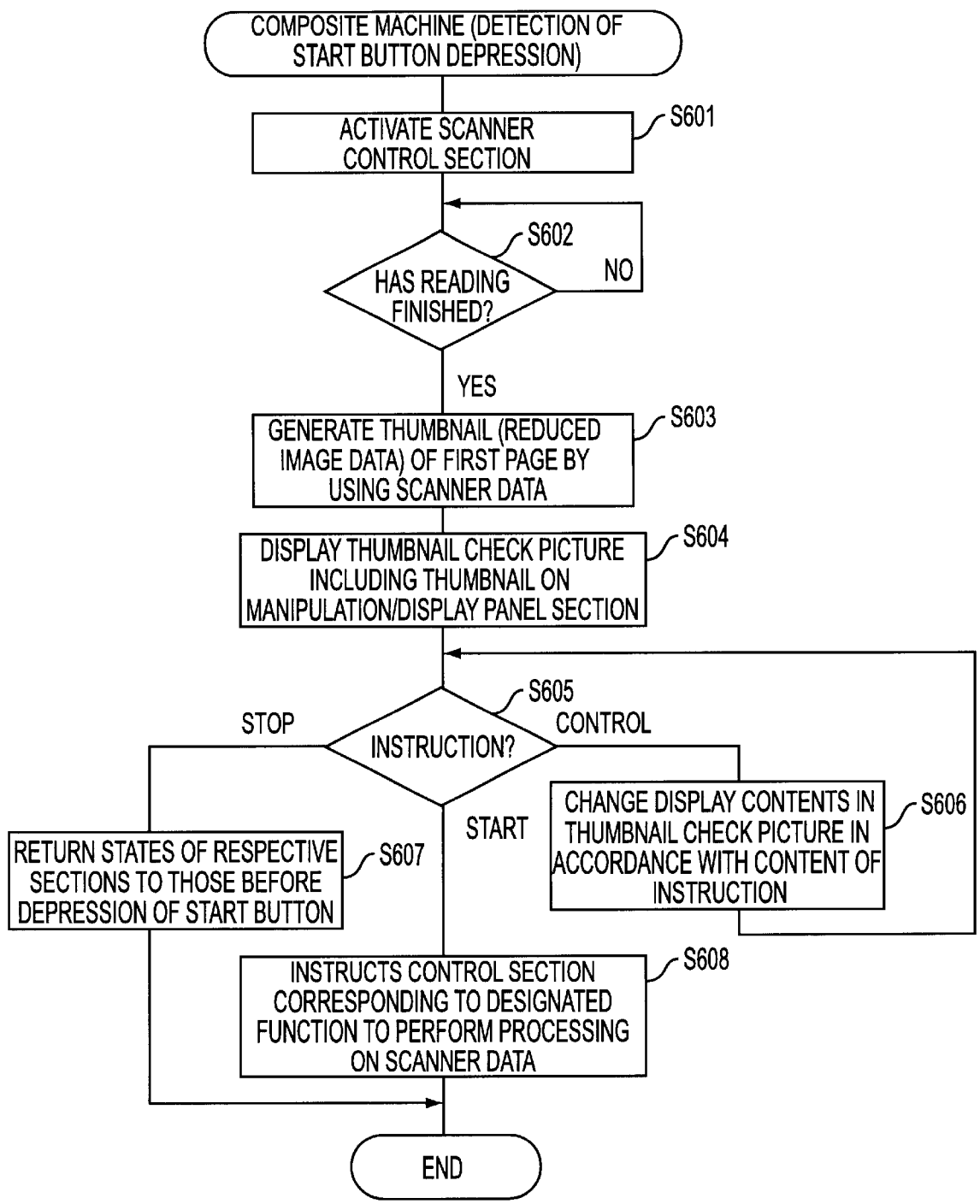
FIG. 26 is a flowchart showing a thumbnail display function of a composite machine according to a second embodiment of the invention.

When data setting for a certain function has been completed and the start button is depressed in a state that the use of the thumbnail display function is set, first the panel control section activates the scanner control section and causes it to read a document that is set in the scanner mechanism section (i.e., convert the document into scanner data) as shown in FIG. 26 (step S601). Then, the panel control section waits for completion of the reading (step S602). When the reading has finished (step S602: yes), the panel control section generates a thumbnail (reduced image) of the first page (step S604). Then, the panel control section causes the manipulation/display panel section to display a thumbnail check picture including the generated thumbnail on the manipulation/display panel section (step S605).

Figure 27:
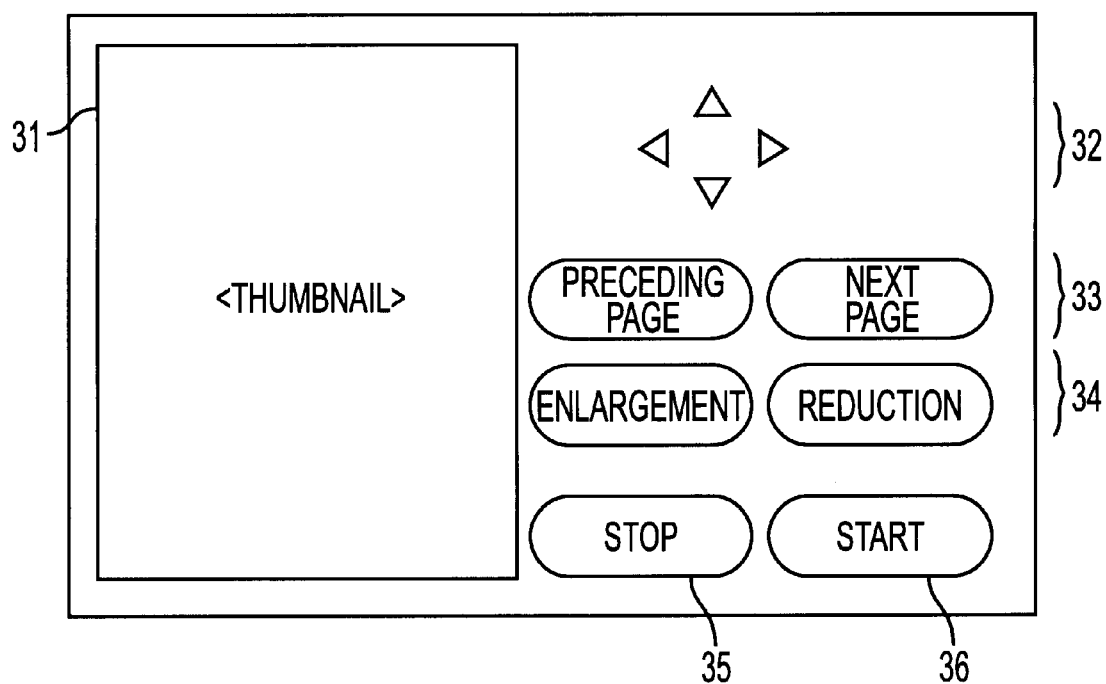
FIG. 27 shows a thumbnail check picture that is displayed in the composite machine according to the second embodiment.

As schematically shown in FIG. 27, the thumbnail check picture consists of a thumbnail display area 31, position control buttons 32, page control buttons 33, reduction factor control buttons 34, a stop button 35, and a start button 36. A portion of a generated thumbnail is displayed in the thumbnail display area 31.

After the display of such a thumbnail check picture, the process makes a transition to a state (step S605) in which the panel control section waits for input of a user's instruction. If selection of one of the control buttons 32–34 is detected (step S605: control), the panel control section changes the display contents in the thumbnail display area 31 in accordance with the selected button (step S606). For example, if one of the page control buttons 33 is selected, the panel control section generates a thumbnail of the next (or preceding) page and displays it in the thumbnail display area 31. If one of the reduction factor control buttons 34 is selected, the panel control section generates a thumbnail having an increased (or decreased) reduction factor of the page being displayed and displays it in the thumbnail display area 31. If one of the position control buttons is selected, the panel control section shifts a thumbnail portion to be displayed in the thumbnail display area 31 upward, downward, rightward, or leftward in accordance with the selected button.

If selection of the start button is detected (step S605: start), the panel control section instructs a control section corresponding to the designated function to start processing on the scanner data (step S606). If selection of the stop button is detected (step S605: stop), the panel control section returns the states of the respective sections to those before the depression of the start button (step S607) and finishes the process of FIG. 26.

As described above, in the composite machine according to the second embodiment, actual processing can be started after it is confirmed by using a thumbnail that conversion to image data was performed correctly. Therefore, useless consumption of sheets and time can be avoided.

Modifications

Although the first and second embodiments are directed to the composite machine-server system in which charging information is collected on a composite machine basis, a composite machine-server system may naturally be constructed so as to be able to collect charging information on a user basis or on a user's section basis. Such a composite machine-server system can easily be realized by, for example, modifying each composite machine so that a user is required to input his ID or the like in manipulating the composite machine and charging information can be recorded on a user basis or a user's section basis by using user IDs.

Although the first and second embodiments are directed to the composite machine-server system in which charging information is collected by the server, it goes without saying that information relating to consumption states of expendable supplies may also be collected by the server.

In the composite machine-server system according to the invention and a composite machine-server system that is constructed by using the composite machine and the server according to the invention, first-kind processes can be executed without the need for providing each composite machine with hardware (circuits for fax, a storage device for document management, etc.) that is needed for only the first-kind processes. Therefore, the same document environment as constructed by using conventional composite machines can be realized at a lower cost.

Further, since electronic documents relating to first-kind processes that are executed by composite machines are gathered by the server, electronic documents can be managed more efficiently.

What is claimed is:

1. A composite machine that is used in a state that it is connected to a network, comprising:

scanner means for generating image data of a document;

first-kind process executing means for executing first-kind processes each of which uses the image data generated by the scanner means and requires an operation in cooperation via the network with a server executing the first-kind processes;

second-kind process executing means for executing second-kind processes each of which uses the image data generated by the scanner means and does not require an operation in cooperation with the server;

designating means for designating a first-kind process to be executed by the first-kind process executing means or a second-kind process to be executed by the second-kind process executing means;

execution control means for causing the scanner means to generate the image data when a first-kind process or a second-kind process is designated by using the designating means, and for causing the first-kind process executing means or the second-kind process executing means to execute the designated first-kind or second-kind process by using the image data;

status judging means for judging whether a status is such that an operation in cooperation with the server is possible;

designation control means for controlling the designating means so that it cannot designate any of the first-kind processes when the status judging means has judged that the status is such that an operation in cooperation with the server is not possible;

utilization states monitoring means for monitoring utilization states of the first-kind process executing means and the second-kind process executing means;

utilization states storing means for storing utilization states information as a monitoring result of the utilization states monitoring means; and utilization states transmitting means for transmitting, to the server, the utilization states information stored in the utilization states storing means.

2. The composite machine according to claim 1, wherein the utilization states information storing means is nonvolatile storing means, and the composite machine further comprising:

destruction detecting means for detecting destruction of the utilization states information stored in the utilization states information storing means; and utilization states information managing means for sending a request for requesting the server to transmit utilization states information relating to the self-composite machine when the destruction detecting means has detected destruction of the utilization states information, and for storing, in the utilization states information storing means, the utilization states information that has been received as a response to the request.

3. A server which is used in such a manner as to be connected to a plurality of composite machines via a network, comprising:

a predetermined number of request processing means each having a function of processing a request from the composite machines that is received via the network;

assigning means for assigning, when receiving a connection establishment request from one of the composite machines via the network, the composite machine that has issued the connection establishment request to one of the predetermined number of request processing means to which no composite machine is assigned if such a request processing means exists, and for sending the composite machine, via the network, an assignment completion notification indicating that an cooperative operation has become possible;

assignment canceling means for canceling assignment of a composite machine to a request processing means that has not received any request from the assigned composite machine for a predetermined time;

utilization states information storing means for storing, on a composite machine basis, utilization states information that is sent from the composite machines; and utilization states information transmitting means for transmitting, when receiving a utilization states information sending request, the utilization states information stored in the utilization states information storing means to an origination node of the utilization states information sending request.

4. The server according to claim 3, wherein the utilization states information storing means is nonvolatile storing means, the server further comprising:

destruction detecting means for detecting destruction of the utilization states information stored in the utilization states information storing means; and utilization states information managing means for sending requests for requesting the respective composite machines to transmit utilization states information when the destruction detecting means has detected destruction of the utilization states information, and for storing, in the utilization states information storing means, the utilization states information that has been received as responses to the requests.

5. A server which is used in such a manner as to be connected to a plurality of composite machines via a network, comprising:

a predetermined number of request processing means each having a function of processing a request from the composite machines that is received via the network;

assigning means for assigning, when receiving a connection establishment request from one of the composite machines via the network, the composite machine that has issued the connection establishment request to one of the predetermined number of request processing means to which no composite machine is assigned if such a request processing means exists, and for sending the composite machine, via the network, an assignment completion notification indicating that an cooperative operation has become possible;

assignment canceling means for canceling assignment of a composite machine to a request processing means that has not received any request from the assigned composite machine for a predetermined time;

utilization states information storing means for storing, on a composite machine basis, utilization states information that is sent from the composite machines; and utilization states information transmitting means for transmitting the utilization states information stored in the utilization states information storing means to an origination node of a utilization states information sending request according to a preset schedule.

6. The server according to claim 3, wherein the utilization states information storing means is nonvolatile storing means, the server further comprising:

destruction detecting means for detecting destruction of the utilization states information stored in the utilization states information storing means; and utilization states information managing means for sending requests for requesting the respective composite machines to transmit utilization states information when the destruction detecting means has detected destruction of the utilization states information, and for storing, in the utilization states information storing means, the utilization states information that has been received responses to the requests.

* * * * *

UNITED STATES PATENT AND TRADEMARK OFFICE
CERTIFICATE OF CORRECTION

PATENT NO.    : 6,434,343 B1
DATED         : August 13, 2002
INVENTOR(S)   : Sumitake Kobayashi et al.

It is certified that error appears in the above-identified patent and that said Letters Patent is hereby corrected as shown below:

<u>Column 24,</u>
Line 47, change "claim 3" to -- claim 5 --;
Line 60, after "received" insert -- as --.

Signed and Sealed this

First Day of April, 2003

JAMES E. ROGAN
*Director of the United States Patent and Trademark Office*